US008691097B2

(12) United States Patent
McCabe

(10) Patent No.: US 8,691,097 B2
(45) Date of Patent: Apr. 8, 2014

(54) SOLIDS REMOVAL SYSTEM AND METHOD

(75) Inventor: Derald L. McCabe, Katy, TX (US)

(73) Assignee: 1612017 Alberta Ltd., Calgary (CA)

( * ) Notice: Subject to any disclaimer, the term of this patent is extended or adjusted under 35 U.S.C. 154(b) by 371 days.

(21) Appl. No.: 13/239,338

(22) Filed: Sep. 21, 2011

(65) Prior Publication Data
US 2012/0006762 A1  Jan. 12, 2012

Related U.S. Application Data

(63) Continuation-in-part of application No. 12/888,329, filed on Sep. 22, 2010, now Pat. No. 8,337,706, which is a continuation-in-part of application No. 12/250,535, filed on Oct. 13, 2008, now abandoned.

(60) Provisional application No. 60/979,858, filed on Oct. 14, 2007.

(51) Int. Cl.
| | |
|---|---|
| *B01D 21/02* | (2006.01) |
| *B01D 17/028* | (2006.01) |
| *C02F 1/463* | (2006.01) |
| *C02F 1/52* | (2006.01) |
| *B01D 21/24* | (2006.01) |
| *B01D 17/02* | (2006.01) |
| *B01D 21/00* | (2006.01) |
| *B01D 19/00* | (2006.01) |
| *C02F 1/00* | (2006.01) |
| *C02F 101/32* | (2006.01) |
| *C02F 103/36* | (2006.01) |

(52) U.S. Cl.
CPC ............ *B01D 21/02* (2013.01); *B01D 21/2494* (2013.01); *B01D 17/0211* (2013.01); *B01D 17/0214* (2013.01); *B01D 2021/0078* (2013.01); *B01D 2021/0081* (2013.01); *B01D 19/0036* (2013.01); *C02F 1/463* (2013.01); *C02F 1/52* (2013.01); *C02F 2001/007* (2013.01); *C02F 2101/32* (2013.01); *C02F 2103/365* (2013.01)
USPC ...... 210/702; 210/744; 210/748.01; 210/802; 210/104; 210/218; 210/257.1; 210/522; 210/537; 210/539; 210/540; 204/660; 204/662; 205/742; 205/743

(58) Field of Classification Search
USPC ............ 210/702, 703, 709, 744, 748.01, 801, 210/802, 104, 209, 218, 221.2, 243, 257.1, 210/521, 522, 533, 534, 537, 539, 540; 204/660, 662; 205/742, 743, 755
See application file for complete search history.

(56) References Cited

U.S. PATENT DOCUMENTS

| | | |
|---|---|---|
| 349,990 A | 9/1886 | Gaillet et al. |
| 1,176,775 A | 3/1916 | Morris |

(Continued)

OTHER PUBLICATIONS

Notice of Allowance, Notice of Allowability, allowed U.S. Appl. No. 12/888,329. Aug. 22, 2012, 11 pages.

(Continued)

*Primary Examiner* — Christopher Upton
(74) *Attorney, Agent, or Firm* — Gordon G. Waggett, P.C.

(57) ABSTRACT

The system and method is directed to improved separation or clarification of solids from a solids-laden liquid and removal of entrained gasses. A liquid to be treated is introduced into the inlet of a solid-liquid separator modified to include one or more sources of vibrational energy. The liquid is directed through a conduit within the separator. This conduit can be configured into a tortuous flow path to assist in the separation of solids from the liquid. Vibrational energy is applied to the flow path, preferably through the flow path conduit. As solids fall out of solution, they are collected. The clarified liquid is also collected. A vacuum can be applied to the system to assist in moving the solid-liquid mixture through the system and to provide vacuum clarification. Electrocoagulation electrodes and gas sparging can also be employed along with height adjustable weirs and an oil accumulator.

22 Claims, 9 Drawing Sheets

(56) References Cited

U.S. PATENT DOCUMENTS

| | | | |
|---|---|---|---|
| 2,181,684 | A | 11/1939 | Walker |
| 2,261,101 | A | 10/1941 | Erwin |
| 2,570,304 | A | 10/1951 | Bach |
| 3,903,000 | A | 9/1975 | Miura et al. |
| 4,132,652 | A | 1/1979 | Anderson et al. |
| 4,324,656 | A | 4/1982 | Godar |
| 4,592,837 | A | 6/1986 | Ludwig et al. |
| 4,802,978 | A | 2/1989 | Schmit et al. |
| 4,816,146 | A | 3/1989 | Schertler |
| 5,236,585 | A * | 8/1993 | Fink .................. 210/521 |
| 5,405,538 | A * | 4/1995 | Batten ................ 210/540 |
| 5,700,378 | A | 12/1997 | Lee et al. |
| 5,741,426 | A | 4/1998 | McCabe et al. |
| 5,766,488 | A | 6/1998 | Uban et al. |
| 5,814,230 | A | 9/1998 | Willis et al. |
| 5,922,064 | A * | 7/1999 | Gordon, Sr. ........ 210/539 |
| 5,928,493 | A | 7/1999 | Morkovsky et al. |
| 7,087,176 | B2 | 8/2006 | Gavrel et al. |
| 7,186,347 | B2 | 3/2007 | Casey et al. |
| 8,337,706 | B2 * | 12/2012 | McCcabe ........... 210/702 |
| 2004/0129633 | A1 | 7/2004 | Edmundson |
| 2009/0095690 | A1 | 4/2009 | McCabe |

OTHER PUBLICATIONS

PCT (ISA/KR)—Notification of Transmittal of the International Search Report and the Written Opinion of the International Searching Authority regarding Applicant's counterpart PCT International Application No. PCT/US2008/079835; mailing date Jun. 4, 2009; 4 pages.

PCT (ISA/KR)—International Search Report in Applicant's counterpart PCT International Application No. PCT/US2008/079835; mailing date Jun. 4, 2009; 3 pages.

PCT (ISA/KR)—Written Opinion of the International Searching Authority in Applicant's counterpart PCT International Application No. PCT/US2008/079835; mailing date Jun. 4, 2009; 4 pages.

Ecologix Environmental Systems, "Stainless Steel Inclined Plate Clarifier", excerpt from ecologixsystems.com website. Printed Jun. 15, 2009.

Rock Services The Pump Man, "Fines Recovery Systems", 2 page excerpt from the rockservices.net website depicting the BRANDT "Hydro-Clear" Clarifier. Printed Jun. 15, 2009.

Brandt (National Oilwell Varco) "Hydro-Clear" Clarifier, one page brochure (Best available) downloaded from the novstore.com website. Printed Jun. 15, 2009.

Mi Swaco, "Environmental Solutions" catalog Version 4, 2009 (136 pages broken out into 5 parts), downloaded Jun. 15, 2009 from the miswaco.com website. In part 5, pp. 136-137 there is a two page description of the Mi Swaco "Multi-Phase Clarifier (MPC)" for "produced water treatment".

Industrial Marketing System—3-page brochure the imswe.com website regarding the "Graver" lamella clarifer. Printed Jun. 15, 2009.

Clearwater Industries—2-page brochure from the clearwaterind.com website regarding the Clearwater Model 3200 Rectangular Water Clarifier. Printed Jun. 15, 2009.

Monroe Environmental—2-page brochure from the monroeenvironmental.com website regarding Wastewater Clarifiers. Printed Jun. 15, 2009.

Monroe Environmental—2-page brochure from the monroeenvironmental.com website regarding the Monroe Compact Clarifier. Dated 2000. Printed Jun. 15, 2009.

Non-Final Office Action mailed Mar. 22, 2010 in parent U.S. Appl. No. 12/250,535 (7 pages).

* cited by examiner

SOLIDS REMOVAL SYSTEM AND METHOD

CROSS-REFERENCE TO RELATED APPLICATIONS

This application is a continuation-in-part of U.S. Nonprovisional patent application Ser. No. 12/888,329 filed Sep. 22, 2010, now U.S. Pat. No. 8,337,706 which in turn is a continuation-in-part of U.S. Nonprovisional patent application Ser. No. 12/250,535 filed Oct. 13, 2008 now abandoned, which in turn claims the benefit of the filing date of and priority to U.S. Provisional Application Ser. No. 60/979,858 entitled "Solids Removal System and Method" and filed Oct. 14, 2007. Said applications are incorporated by reference herein.

STATEMENT REGARDING FEDERALLY SPONSORED RESEARCH OR DEVELOPMENT

Not Applicable.

BACKGROUND OF THE INVENTION

The present invention is directed generally to a method and apparatus for removing solids from a solid-liquid mixture, as well as the removal of entrained gasses. Example solid-liquid mixtures include, e.g., drilling mud used in the oilfield industry, sewage, coal slurries, mining wastes, feed water for industrial applications, and other mixtures desired to be clarified. By way of one example, the method and apparatus of the present invention could be used alone or in combination with de-silters, de-sanders, de-gassers, shakers and shaker screens, and/or centrifuges used to treat drilling fluids in an oil field application.

BACKGROUND ART

As described in the Applicant's commonly owned U.S. Pat. No. 5,741,426, which is incorporated herein by reference in its entirety, there is described a method and apparatus for treatment of contaminated water, containing undesired solid, liquid, and/or gaseous materials which includes an electro-floculation means for disassociating ions from the undesired solid material and from the contaminated water, and further includes a separation tower having various deflection means deflecting undesired solid materials downwardly through the separation tower.

The Applicant's U.S. Pat. No. 5,741,426 also teaches the use of an upward tortuous or serpentine flow path in a vacuum-assisted separator/clarifier to aid in the separation of solids from the solid-liquid mixture passing therethrough. As such, it would be desirable to further enhance the solids separation achieved from the solid-liquid mixtures passing through a separator of the type described in Applicant's U.S. Pat. No. 5,741,426. It would also be desirable to enhance the separation of the solids from the liquids present in other mechanical solid-liquid separation units.

BRIEF SUMMARY OF THE INVENTION

To address the forgoing desires, the present invention teaches the use of one or more sources of vibration to enhance the solid-liquid separation occurring in a solid-liquid separator system.

The present invention is directed to a method and apparatus for improved separation or clarification of solids from a solids-laden liquid. A liquid to be treated is introduced into the inlet of a solid-liquid separator modified to include one or more sources of vibrational energy. The liquid to be treated is directed through a conduit within the separator. Preferably the conduit within the separator is configured into a tortuous flow path to assist in the separation of solids from the liquid. Vibrational energy is applied to the flow path, preferably through the flow path conduit. As solids fall out of solution, they are collected. The clarified liquid is also collected. A vacuum can be applied to the system to assist in moving the solid-liquid mixture through the system and to provide vacuum clarification.

For example, the separator unit depicted in Applicant's U.S. Pat. No. 5,741,426 can be modified such that at least one source of vibration is applied to the separator thereby enhancing the separation of the solids from the solid-liquid mixture passing through the separator. Such source of vibration can be mounted on the exterior of the separator unit (or potentially within the unit) so that the vibration passes into the interior of the separator. For example, a vibrator motor could be mounted on the outside of the separator depicted in Applicant's U.S. Pat. No. 5,741,426 so that the vibration passes into the baffle/deflection plates forming the generally serpentine flow path. The vibration can be created by any available source, such as, mechanical, electrical, air-driven, or hydraulic-driven vibrator devices and/or by sonic waves, microwaves, or other source of vibration.

In one preferred embodiment, the solids elimination system of the present invention consists of a square, rectangular or round vertical vessel with slanted baffle plates designed to cause a tortuous flow path for the solids laden liquid inside of the vessel. The system preferably has a vacuum apparatus to provide a lowered pressure or vacuum inside the vessel. The lower pressure is regulated by a adjustable vacuum regulating valve located at the suction of the vacuum apparatus. Another apparatus is provided to remove the clean liquid (such as, drilling fluids) by means of a pump or other apparatus such as a liquid eductor. As the liquid phase is separated, the resulting solids laden slurry is removed by a mechanical means such as a pump, augur, dump valve or other means. The liquid level is controlled by float switch or other liquid level control devices and a motor control flow valve.

Solids laden fluids, such as drill mud with solids entrained, are pulled into the apparatus by means of the vacuum, through the inlet header located at the top of the first slant plate. In one preferred embodiment, the first slant plate is made of thick plate and has a vibrator motor attached to the bottom of the plate. A connecting rod can preferentially be attached to each deflector and to the vibrator motor to distribute the vibration. The vibrator motor can also be set on top of the vessel and connected to each plate by means of the connecting rod. The vibrator motor can also be installed on the side of the vessel thereby having contact with the shell and all the baffle plates. The vibration is designed to disturb the molecular bonding of the liquids and the vibration amplification can be controlled by means of a V.F.D. (variable frequency drive) or other apparatus to change the rotational speed of the motor (and hence the vibration intensity). If a air or hydraulic vibrator device is used, the amplification can be controlled through pressure regulation or valve arrangements. If electric or electronic vibration such as sonic or microwaves are used, the amplification can be adjusted by electronic means.

As the flow of solids laden liquid enters the inlet header it is directed downward across the first vibrating plate. The vibration applied to the bottom plate disturbs the molecular bond of the liquids and causes rapid settling of solid particulate matter. The downward flow along with the vibration pushes the particulates to the lower edge of the slant plate where it is then directed into a standoff conduit. The flow characteristics in the standoff conduit are such that the lack of flow does not keep the solid particulates entrained, but rather permits them to fall out to the bottom of the standoff conduit where they can be discharged for further handling, disposal or use as may be desired.

The flow of the solid-liquid mixture to be treated is directed upwardly through a tortuous path caused by the baffle arrangement. As the solids laden liquid moves upwards through this tortuous path, solids are separated and fall into the standoff conduit thereby repeating the process until all undesirable particulate is removed. Entrained gasses will also be released by the vibration and removed via the vacuum source.

There is described a vacuum assisted solid-liquid separation apparatus for treating contaminated liquids contaminated with undesired solids and gasses. In one embodiment, this apparatus has an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface. The tower interior space defined as the space within the outer wall, top wall and bottom wall. The apparatus is outfitted with a contaminated liquids inlet located proximate the vessel lower end for introducing the contaminated liquids into the tower interior space and a clarified liquids outlet located above the contaminated liquids inlet for discharging the clarified liquids to a desired location. A plurality of baffle plates are disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner.

One or more solids discharge ports are located in one or more of the downward slope corners. A standoff conduit is provided in fluid communication with the one or more solids discharge ports for receiving solids from the contaminated water through the one or more solids discharge ports, the standoff conduit having at its lower end a solids outlet port and its upper end being in fluid communication with the tower interior space. The apparatus also employs a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and one or more sources of vibrational energy applied to the separation apparatus.

The vibration energy sources are preferably created by mechanical, electrical, air-driven, or hydraulic-driven vibrator devices and/or by sonic waves, microwaves, or sources of vibration that provide for control of the amplification of the vibration by means of a variable frequency drive or other apparatus to change the intensity of the vibration. In one embodiment, a single source of vibrational energy is applied to the separation apparatus; in another, more than one source of vibrational energy is applied to the separation apparatus. The source of vibrational energy may be directed to the plurality of baffle plates. The source of vibrational energy can be located on the bottom, top and/or side of the tower.

In another embodiment, the solid-liquid separation apparatus further comprises a connecting rod extending from the lower end of the tower and upward through the plurality of baffle plates, the connecting rod having a first end located proximate one of the one or more vibrational energy sources and a second end terminating either within the tower interior space or extending into the tower upper end. The connecting rod second end can extend into the tower upper end and both ends of the connecting rod can receive a source of vibrational energy from the vibrational energy sources.

The solid-liquid separation apparatus tower can be substantially cylindrical, rectangular or square in shape.

In one embodiment, the standoff conduit is located within the tower. In another embodiment, the standoff conduit is located external to the tower.

The solid-liquid separation apparatus can further comprise an inlet control valve for controlling the flow of contaminated liquid through the contaminated liquids inlet, a clarified liquid outlet control valve for controlling the flow of clarified liquid through the clarified liquids outlet, a solids discharge control valve for controlling the flow of solids out of the standoff conduit and a liquid level control device for monitoring and controlling the liquid level in the tower. A process controller can be employed to monitor and coordinate the operation of the inlet control valve, the clarified liquid outlet control valve, the solids discharge control valve and/or the liquid level control device.

A pump can be connected with the solids outlet port to facilitate removal of received solids from the standoff conduit.

In one embodiment, of the solid-liquid separation apparatus, the angularly disposed baffle plates are angularly disposed with respect to the longitudinal axis of the separation tower between 1 and 45 degrees. In another embodiment, the angle is between 45 and 60 degrees.

In another embodiment, the separator device further comprises one or more electrocoagulation electrodes housed within the serpentine fluid passageway capable of discharging an electrical current into the fluid, wherein the electrodes are capable of alternating between a positive polarity and a negative polarity and are controlled by process control equipment.

There is also described a method of removing undesirable solids and gasses from liquid contaminants comprising the steps of: (a) directing solids laden liquids into the inlet of a vacuum assisted solid-liquid separation apparatus such as described herein for treating contaminated liquids contaminated with undesired solids and gasses; (b) applying at least one vibrational energy source to the separation apparatus; (c) applying a vacuum source at the vacuum inlet via the vacuum apparatus; (d) flowing the solids laden liquids from the inlet upwardly through the generally serpentine fluid flow passageway with the vacuum apparatus to cause undesired solid materials striking the baffle plates to be directed downwardly into the standoff conduit toward the lower end of the separation tower; (e) removing clarified liquid from the separation tower through the clarified water outlet; (f) removing undesired gasses out through the vacuum apparatus; and (g) removing undesired solids from the standoff conduit. In embodiments using adjustable height weirs, the method includes the additional steps of adjusting the effective weir height to optimize operation.

The method can further comprise steps of monitoring and coordinating the operation of the inlet control valve, the clarified liquid outlet control valve, the solids discharge control valve and/or the liquid level control device. The method can also include controlling the amplification or intensity of the vibration. In one embodiment of the method, the vibrational energy is directed to the serpentine flow pathway.

Where the separator device employs electrocoagulation electrodes, the method further comprises the step of introducing a current from the electrodes into the serpentine fluid passageway, and alternating the polarity of the electrodes between positive and negative polarity.

The solid-liquid separation apparatus may further comprise one or more gas spargers mounted within the serpentine fluid passageway in an area above the one or more solids discharge ports located in the one or more of the downward slope corners for introducing a sparge gas into the serpentine fluid pathway. The method would also include the step of introducing said sparge gas into the serpentine fluid pathway.

The solid-liquid separation apparatus may further comprise a chemical injection port for introducing into the serpentine fluid path one or more desired treatment chemicals, and the method would further comprise the step of introducing the one or more chemicals into the serpentine fluid pathway.

In another embodiment of the present disclosure, there is described a vacuum assisted solid-liquid separation apparatus for treating contaminated liquids contaminated with undesired solids and gasses, comprising: (a) an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface; (b) a tower interior space defined as the space within the outer wall, top wall and bottom wall; (c) a contaminated liquids inlet located proximate the vessel lower end for introducing the contaminated liquids into the tower interior space; (d) a clarified liquids outlet located above the contaminated liquids inlet for discharging the clarified liquids to a desired location; (e) a plurality of baffle plates disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner; (f) one or more solids discharge ports located in one or more of the downward slope corners; (g) a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space; (h) one or more upper discharge slots located in one or more of the upward slope upper corners; (i) a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space; (j) a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and (k) one or more sources of vibrational energy applied to the separation apparatus. In other embodiments, this device can employ electrocoagulation electrodes, gas sparging, and/or injection of one or more chemical additives.

In another embodiment, the separation apparatus has a vacuum equalization conduit inlet in fluid communication with the tower interior space and located above the clarified liquid outlet. In this embodiment, the separation apparatus is also equipped with an oil accumulator for collecting oil. The accumulator comprises an enclosed housing having a top, a bottom, sidewalls and an inner chamber, an accumulator oil inlet proximate or in the accumulator top. The discharge tubing is connected between the accumulator oil inlet and the secondary standoff upper outlet, and places the accumulator inner chamber in fluid communication with the secondary standoff conduit. The accumulator also employs a vacuum inlet proximate the accumulator top, a vacuum equalizer conduit connected between the accumulator vacuum inlet and the vacuum equalization conduit inlet, the equalizer conduit placing the accumulator inner chamber in fluid communication with the tower interior space. The accumulator also uses an oil outlet located in or proximate the accumulator bottom, an oil outlet conduit connected to the oil outlet, an oil outlet control valve connected to the oil outlet conduit for discharging oil from the accumulator through discharge conduit to a desired location. The control valve employs a one-way check valve on the discharge side of the control valve. The accumulator may also be equipped with an upper liquid level control device within the accumulator inner chamber to sense the liquid level and communicate with the oil outlet control device, and a lower liquid level control device within the accumulator inner chamber to sense the liquid level and communication with the oil outlet control device. The accumulator can be substantially cylindrical, rectangular or square in shape.

In another embodiment of the present disclosure, the accumulator comprises a centrally-located vertical partition extending across the accumulator internal chamber and upwardly in the chamber from the accumulator bottom to a desired height within the chamber. The partition creates a lower right chamber and a lower left chamber. The accumulator oil inlet is located proximate the right chamber to permit entry of oil from the weir to be directed into the right chamber. The oil collects in the right chamber and is capable of spilling over the partition into the left chamber. The left chamber oil outlet is located in or proximate the accumulator bottom in the left chamber. The left chamber oil outlet is connected to the oil outlet conduit. A right chamber outlet is located in or proximate the accumulator bottom in the right chamber. An outlet control valve is connected to the right chamber outlet conduit for discharging contents from the accumulator right chamber through discharge conduit to a desired location. The control valve employs a one-way check valve on the discharge side of the control valve. The lower liquid level control device is located within the accumulator left chamber to sense the liquid level and for communication with the oil outlet control device. A second lower liquid level control device is located within the accumulator right chamber to sense the liquid level and for communication with said right chamber outlet control valve.

The vacuum assisted solid-liquid separation apparatus of may also advantageously employ a height adjustable weir. In one embodiment, the height adjustable weir is a rotatably adjustable weir comprising a swivel joint mounted in-line of the discharge tubing proximate the secondary standoff conduit upper outlet. The swivel joint is capable of directing the discharge tubing upward at an angle ranging between about 0 degrees and 90 degrees to create an increase in the effective weir height as the tubing moves upward, and to create a decrease in the effective weir height as the tubing moves downward. Preferably, the discharge tubing is flexible. The swivel joint may be selected from the group consisting of manually operated swivel joints and automatic motor driven swivel joints.

In another embodiment, the height adjustable weir is a tubing height adjustable weir comprising a moveable conduit guide movably mounted proximate the secondary standoff conduit upper outlet. The conduit guide is capable of securing the discharge tubing at desired heights relative to the upper outlet to provide a desired effective weir height. Preferably, the discharge tubing is flexible.

In yet another embodiment, the height adjustable weir is a gate height adjustable weir comprising: a weir housing having an internal weir airspace, an upper end, and a lower end. The weir housing is mounted in sealed fashion on the exterior of the separator over the secondary standoff conduit upper outlet. The upper outlet has an upper boundary and a lower boundary. This weir embodiment also comprises a moveable gate mounted in a slot, the gate capable of being moved upwardly and downwardly in the slot, the slot positioning gate proximate and below the upper outlet, the upward movement of the gate creating an increase in an effective weir height, the downward movement of the gate creating a decrease in the effective weir height. A discharge conduit is attached to the weir housing lower end, the discharge conduit being in fluid communication with the internal weir space. The gate height adjustable weir may be manually adjustable or may be automatically adjustable via motorized operation and the like.

BRIEF DESCRIPTION OF THE SEVERAL VIEWS OF THE DRAWINGS

FIG. 3A is a partial cross-sectional view taken along line 3A-3A of FIG. 3.

DETAILED DESCRIPTION OF THE INVENTION

Figure 1:
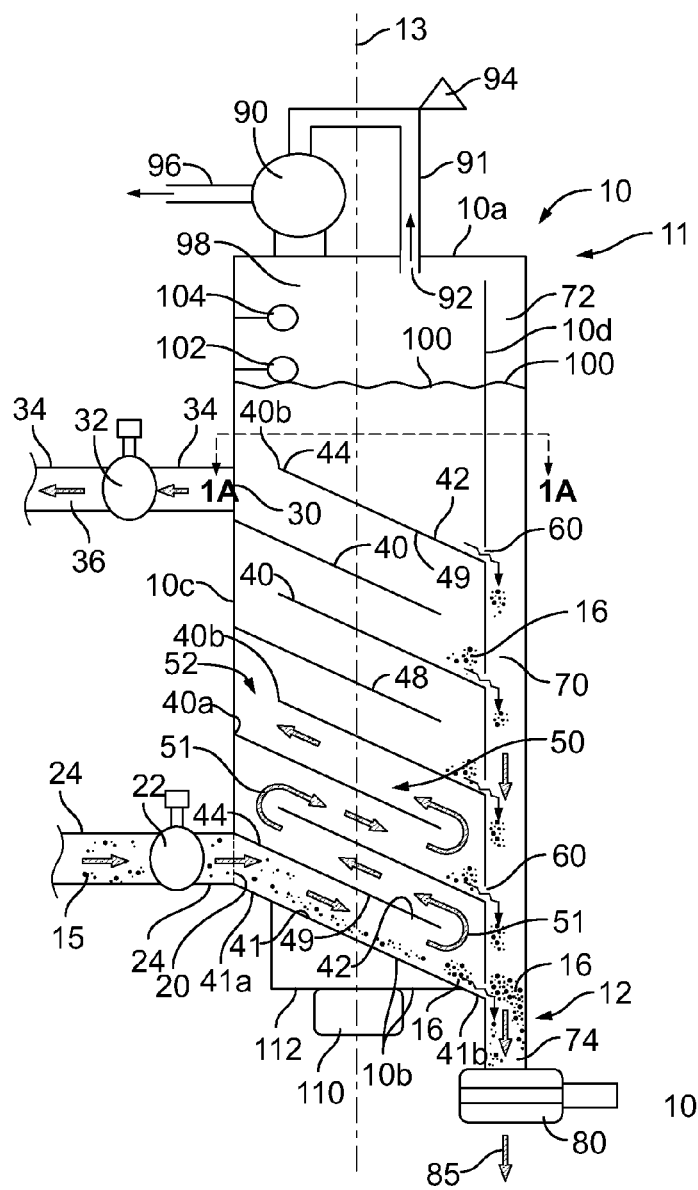
FIG. 1 is a partial cross-sectional view of one embodiment in accordance with the present invention of an apparatus for treatment of contaminated water.
Figure 1A:
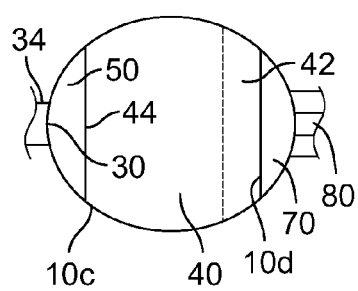
FIG. 1A is a partial cross-sectional view taken along line 1A-1A of FIG. 1 depicting a separation tower embodiment having a cylindrical shape.

Reference is now made to the drawings which depict preferred embodiments of the present invention, but are not drawn to scale. Referring now to FIGS. 1-5, there are shown partial cross-sectional views of various separation tower 10 embodiments in accordance with the present invention for use in the treatment of solids laden water 14.

In a preferred embodiment, the separation tower 10 is oriented vertically along a longitudinal axis 13, and has an upper end 11 and a lower end 12. The vessel can be any general shape, but a preferred shape would be cylindrical or rectangular. The vessel construction is designed to be a closed system that can withstand the maximum pressure that can be pulled by a vacuum, e.g., approx. 29.92 inches of Mercury.

A source of contaminated liquid (e.g., a solids/gas laden liquid) 15 is conveyed in the inlet conduit 24 and introduced into the separator 10 via inlet 20. The inlet conduit is in fluid communication between the source of contaminated water (e.g., a holding tank) and the separator 10. Ideally, the flow rate of the mixture 15 flowing into the separator 10 is regulated by, e.g., an inlet motor control valve 22. As the solids laden liquid mixture 15 enters the separator 10, it flows downwardly along the first of a plurality of baffle plates (or slant plates or deflection plates) 40. Each plate 40 has an upper end 44 and a lower end 42 and is angularly disposed with respect to the longitudinal axis 13. Preferably, some of the baffle plates 40 slope downwardly toward the lower end 12 of the separator tower 10, whereby at least some of the baffle plates 40 define a generally serpentine fluid passageway or path 50 as shown by arrows 51 through which the contaminated water 15 flows. However, preferably all of the baffle plates 40 are angularly disposed as illustrated for baffle plates 40 in FIGS. 1-5. Preferably, baffle plates 40 are angularly disposed within a range of from 1 degree to 45 degrees with respect to the longitudinal axis 13 of tower 10. The angle can also preferably be between 45 and 60 degrees. The first plate 41 can also form the base or floor of the separator and is the first plate to receive waste stream 15 from the inlet 20. At the lower end 42 of alternating plates 40 is located a solids discharge port 60 located in the downward slope corner area 40c. The plurality of plates 40 are oriented generally parallel to each other. The plates 40 are mounted within the separator 10 in an alternating fashion such that the space created between them forms a serpentine-like flow path chamber 50 that directs the flow of contaminant stream 15 from the inlet 20 through the path 50 and eventually up to the outlet 30. The separator 10 has an outlet 30 for discharging clarified or treated water 36 through outlet conduit 34 to a desired location, such as, to be recycled into the system, be disposed, or used as desired by the operator. Preferably, the discharge of water through outlet 30 is regulated by a valve 32 that can be used in connection with a means of conveyance, such as, an eductor, pump or other suitable device known in the art to draw liquid from the outlet 30 to a desired location. As such, the lower portion of the separator 10 containing the plurality of plates 40 forces the solids-laden mixture to progress along the tortuous path 50 created by the juxtapositioning of the plates 40. It is to be understood that the invention is not limited to the exact details of construction, operation, exact materials or embodiment shown and described, as obvious modifications and equivalents will be apparent to one skilled in the art. For example, apparatus 10 could include some, or all of the components illustrated with apparatus 10, as well as the various deflection means may have other cross-sectional configurations than those illustrated.

Similar to the baffle structure depicted in connection with element 120 of U.S. Pat. No. 5,741,426, the separation tower 10 of the present invention is an enclosed structure with an interior space 98 capable of permitting a vacuum to be drawn upon such space. As such, the separation tower will generally have a top wall or ceiling 10a, a bottom wall or floor 10b, and one or more side walls 10c. The separator side wall 10c can be a singular cylindrical structure (such as where the separation tower is generally cylindrical in shape). If the separation tower is rectangular in shape, then the tower would have four side walls 10c-1, 10c-2, 10c-3 and 10c-4 (see FIG. 1B) generally forming the rectangular shape. Within the inside of the separation tower, the tower preferably includes a plurality of baffle plates 40 disposed in a spaced apart relationship, with at least some of the baffle plates 40 being angularly disposed with respect to the longitudinal axis 13 of the separation tower 10. Preferably, some of the baffle plates 40 slope downwardly toward the lower end 74 of the separation tower 10, whereby at least some of the baffle plates 40 define a generally serpentine first fluid passageway 50, as shown by arrows 51, through which the contaminated water 15 flows. Also, the baffle plates could be disposed substantially perpendicular to the longitudinal axis 13 of separation tower 10. However, preferably all of the baffle plates 40 are angularly disposed as illustrated. One of the many ways of creating the serpentine or tortuous path 50 is where the deflection members or baffle plates 40 are disposed in at least two generally parallel rows, with the baffle plates of adjacent rows of baffle plates being disposed in a staggered relationship with each other.

Figure 1B:
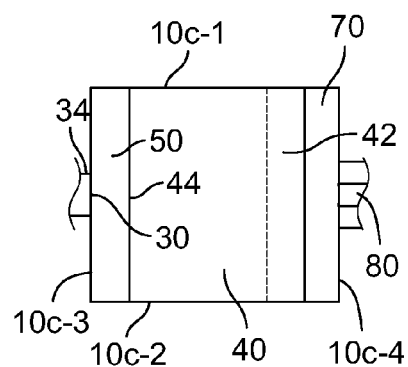
FIG. 1B is a partial cross-sectional view taken along line 1A-1A of FIG. 1 depicting a separation tower embodiment having a rectangular shape.
Figures 2, 2A:
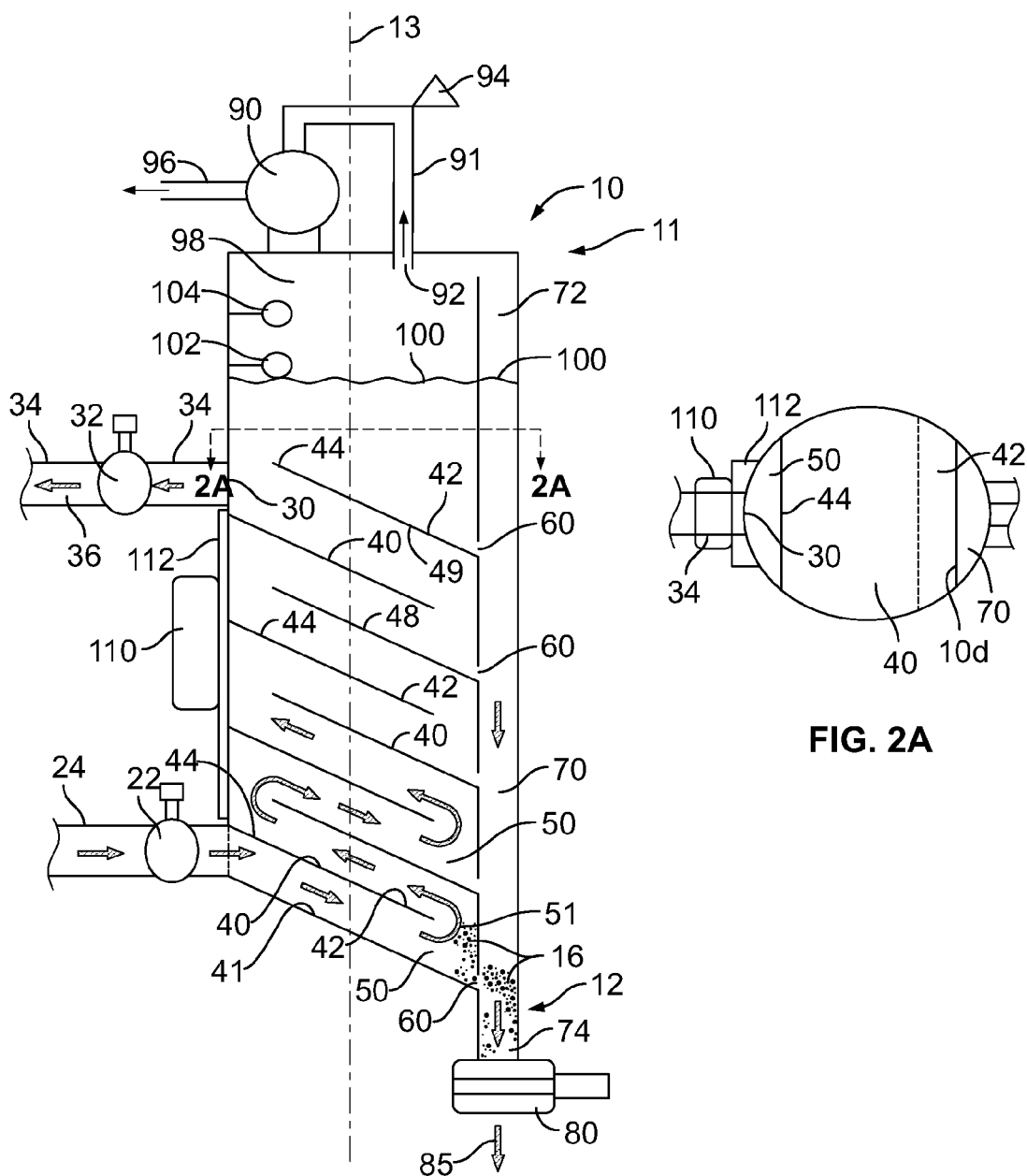
FIG. 2 is a partial cross-sectional view of one embodiment in accordance with the present invention of an apparatus for treatment of contaminated water.
FIG. 2A is a partial cross-sectional view taken along line 2A-2A of FIG. 2.
Figure 3:
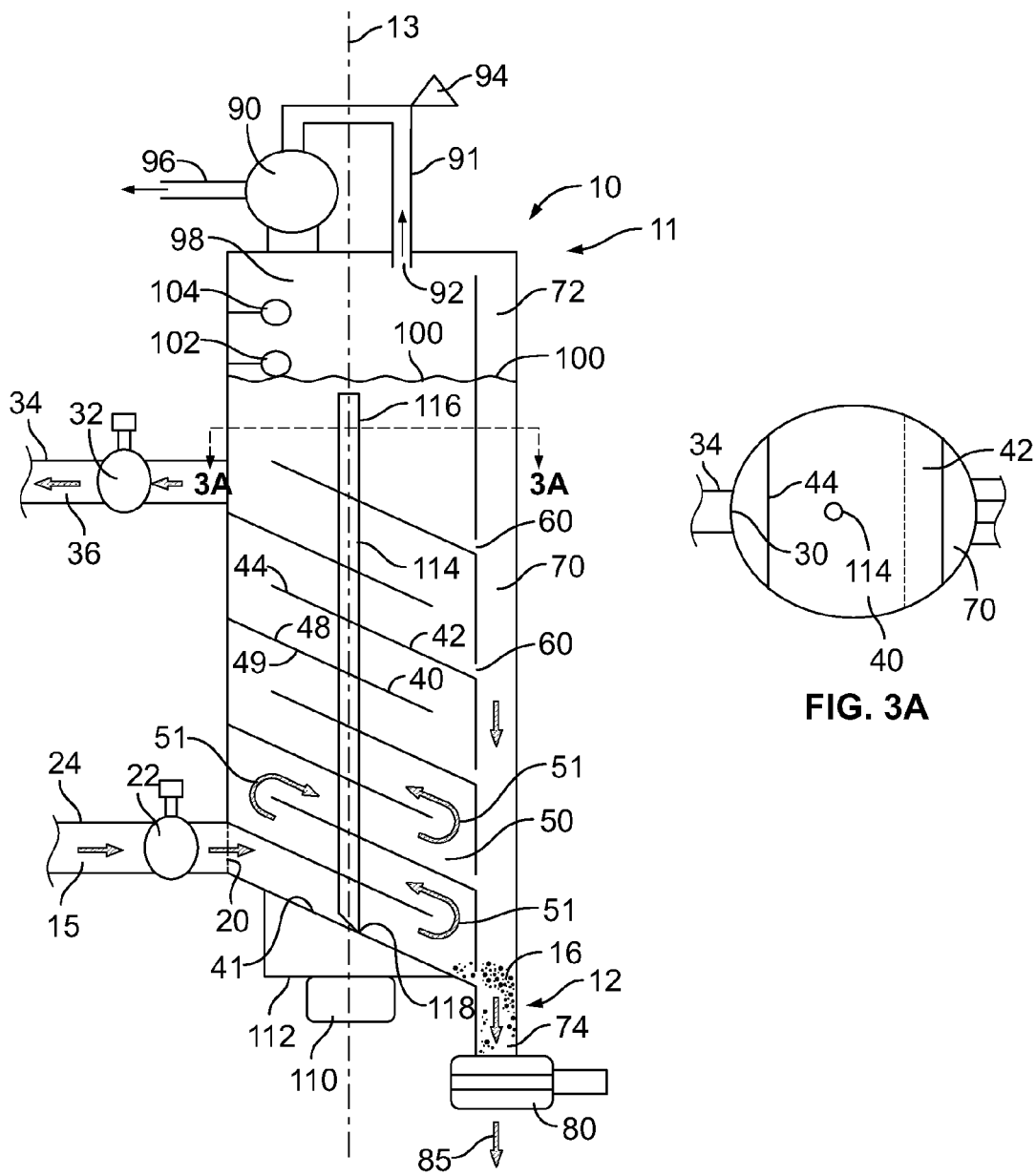
FIG. 3 is a partial cross-sectional view of one embodiment in accordance with the present invention of an apparatus for treatment of contaminated water.

With reference to FIGS. 1-3, the interior of the tower 10 can be vertically partitioned with partition bulwark 10d. One of the two parallel rows of baffle plates can be mounted to this partition bulwark, while the other of the two parallel rows of baffle plates can be mounted on the tower wall 10c opposite the partition bulwark 10d. The partition bulwark extends across the bottom 10a of the tower 10 interior upward toward the top of the tower 10b, above the topmost of the plurality of baffle plates 40, but preferably not all the way to the top of the tower 10b. At the lower end 42 of each baffle plate mounted to the partition bulwark 10d, there is found a solids discharge port 60. It will be understood that each baffle plate 40 is secured in sealed relationship on its two side edges to the inside surface of the tower wall 10c. Although FIGS. 1, 1A, and 2-5 depict an embodiment of the separation tower that is cylindrical in shape, other tower shapes are possible, such as, for example, a generally rectangular shape as illustrated with FIG. 1B (with outer walls 10c-1, 10c-2, 10c-3 and 10c-4).

As the contaminated water is drawn into the separator 10 through inlet 20, it flows along the bottom or first plate 41 from the bottom plate upper end 41a to the bottom plate lower end 41b. At the lower end 41b of the bottom plate 41, there is located the partition bulwark 10d. Located above the contaminated water inlet 20 is a baffle plate 40 attached to the separator wall 10c at the baffle plate attachment edge 40a and extending parallel to the first plate 41. This baffle plate's length extends across the separator but does not extend completely across the separator thereby leaving a gap 52 between its baffle plate outer edge 40b and the wall opposition its point of attachment 40a (i.e., where the plate 40 attaches to the separation tower wall 10c, the gap will be formed between the plate outer edge 40b and the partition bulwark 10d; where the plate attaches to the separation bulwark 10d, the gap will be formed between the plate outer edge and the separation tower wall 10c). The contaminated water 15 moving along the first plate 41 is deflected upward along the bulwark 10d until it hits the underside of the next of the alternating plates 40, this next plate being mounted to the bulwark. The contaminated water continues movement upwardly until it deflects off the tower wall 10c and up against the next plate, and so forth. As such, as the contaminated water continues to move upwardly within separation tower 10 by the operation of vacuum pump 90, undesired solid materials 16 within contaminated water 15 strike the underside 49 of the baffle plates 40 and are thus directed downwardly toward the lower end 74 of separation tower 10 via being discharged through the solids discharge ports 60 and into the standoff conduit 70, which, in the embodiments of FIGS. 1-3 and 5 is formed by the space between the backside of bulwark 10d (i.e., the side of bulwark opposite the side having the plates 40 attached thereto). As discussed below, in another embodiment (see FIG. 4), the separation tower does not contain the internal bulwark 10d and the standoff conduit 70A is formed as a separate conduit external to the separation tower 10. Preferably, baffle plates 40 are angularly disposed within a range of from 1° to 45° with respect to the longitudinal axis 13 of tower 10. Preferably, the plurality of baffle plates is located above the contaminated water inlet 20. The first plate 41 may serve as the base of the separation tower 10, and would be preferably located even with or below the contaminated water inlet 20.

As the contaminated water 15 is drawn or urged upwardly within separation tower 10 by, e.g., the operation of vacuum pump 90 or other motive means, undesired solid materials 16 within contaminated water 15 strike the underside of the baffle plates 49 and are thus directed downwardly toward the lower end 74 of separation tower 10. As the waste mixture flows downwardly along the downward slope from the plate upper end 44 to the plate lower end 42, solids 16 will fall out and preferentially be directed into the solids discharge port 60 located in the downward slope corner area 40c rather than making an upward turn required to continue along the tortuous or serpentine path 50. The liquid, on the other hand, will preferentially continue along the path of least resistance up through the serpentine path 50 towards the outlet 30. Each solids discharge port 60 is in fluid communication with standoff conduit 70, 70A and is preferentially of a smaller opening size than that of, e.g., the outlet 30 so that the path of least resistance for the liquid will be toward the outlet 30, and not through the solids discharge port 60. It will be understood to those of ordinary skill in the art that the size and shape of the solids discharge port 60 can be varied, for example, a rectangular slit design or a circular opening design are potentially used port configurations. Standoff conduit 70, 70A has an upper end 72 in fluid communication with the tower interior space 98 and a lower end 74. As the solids 16 drop through solids discharge port 60, they will fall toward the standoff conduit lower end 74 where they can be discharged from the separator 10 via, e.g., a solids discharge valve 80. As will be mentioned below, in a preferred embodiment, a vacuum may be applied to the interior air space 98 of the separator 10 to assist in the solids-liquid separation, and to assist in drawing the contaminated liquid 15 into and up through the separator 10, as well as drawing off undesired gasses. If such vacuum system is employed, then such solids discharge valve is preferably a rota-lock valve or other valve designed to collect solids from the standoff lower end 74 without disrupting the vacuum pressure in the system. The solids 16 collected in the lower end 74 of the standoff conduit 70 can be removed either continuously or periodically by operation of the solids discharge valve 80. The solids 16 that are released through solids discharge valve 80 can then be conveyed to another desired location by suitable conveyance devices, such as, for example, belt conveyor, auger, cuttings box, sludge pump, etc.

Figures 4, 4A:
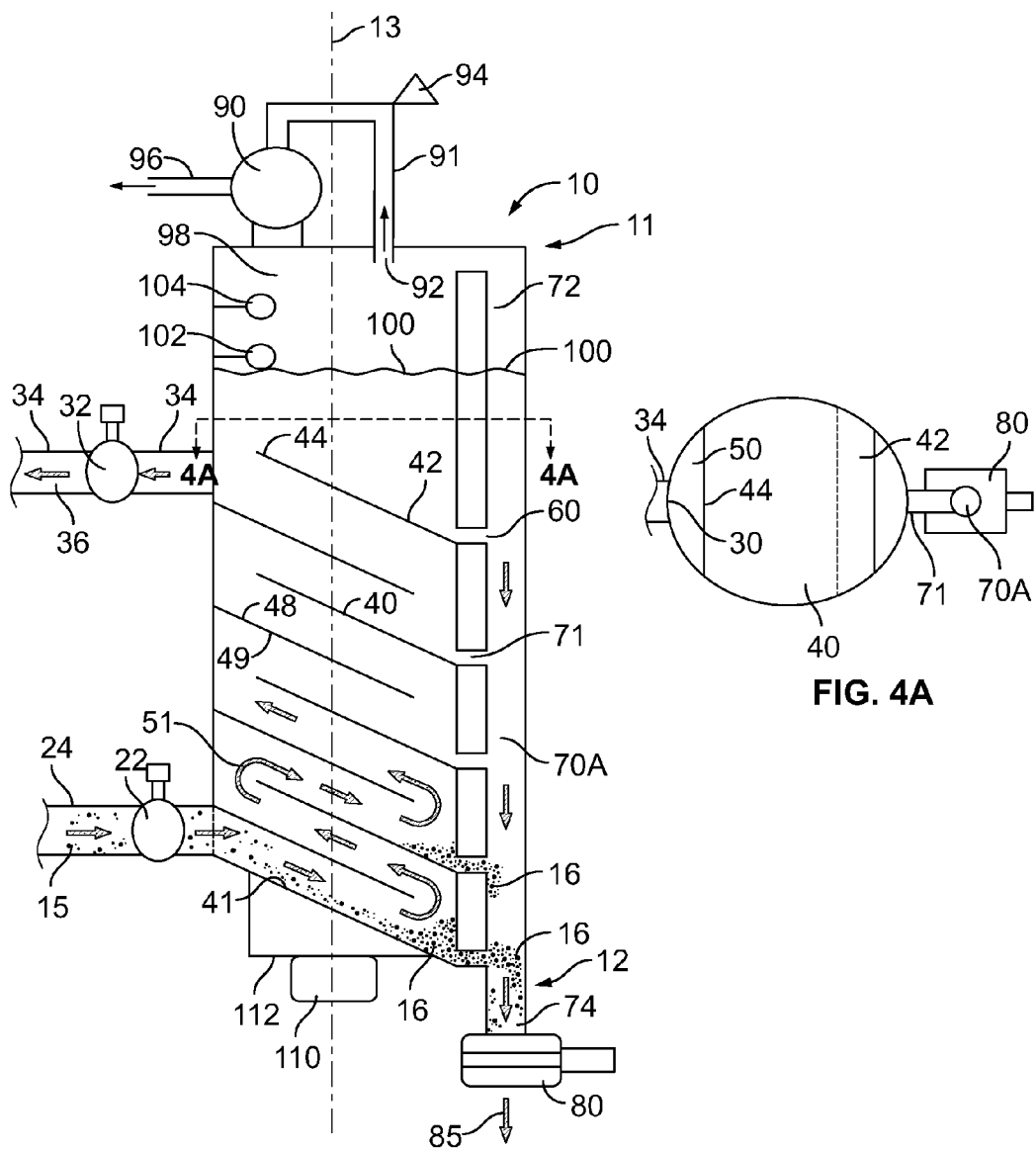
FIG. 4 is a partial cross-sectional view of one embodiment in accordance with the present invention of an apparatus for treatment of contaminated water.
FIG. 4A is a partial cross-sectional view taken along line 4A-4A of FIG. 4.

Referring to FIGS. 4 and 4A there is depicted an external standoff conduit 70A that is created as a standalone pipe section. Each solids discharge port 60 is linked in fluid communication with external standoff conduit 70A via discharge port conduits 71. Although the discharge port conduits 71 are depicted shown as horizontal conduits, they could be angularly mounted to continue the downward slope of the plate 40. As will be understood to those of ordinary skill in the art, many different standoff conduit configurations could be employed.

Preferably, the serpentine-like channel or path 50 begins proximate the contaminated liquid inlet 20, and ends proximate the treated water outlet 30.

During operation of the separator, the fluid level will rise to the water line (or liquid level) 100. The liquid level can be regulated and monitored with a float valve/switch or other suitable device 102. In a preferred embodiment, the operation of the inlet valve 22, outlet valve 32, liquid level indicator 102, and solids discharge valve 80 are coordinated and in communication to permit smooth operation of the separator 10.

In a preferred embodiment, a vacuum clarification system is employed. Through the use, or application of an applied vacuum, liquids having a difference of greater than 0.05 specific gravity may be effectively separated. In addition, particulate solids by virtue of greater weight (or density), than the liquids in which they are suspended, may also be separated from one or more liquid phases. The basis upon which vacuum clarification operates is that of barometric differentiation. Specifically, at sea level (0.0 ft. altitude), the atmosphere exerts a force equal to 14.7 lbs/sq. in. This value may also be read as 760.0 mm Hg (29.92 inches Hg) in a barometer. This pressure of 1 atmosphere (14.7 lbs/sq. in.) also equates to an equivalent head of water of 34.0 ft. @75 degrees F.

In this preferred embodiment, a vacuum pump 90 is employed to pull a vacuum on the interior air space 98 of the separator/vessel 10 via vacuum inlet conduit 92. The vacuum pump employs a discharge port 96 for directing discharged air/gas to a desired location of the operator (e.g., the vacuum discharge may contain gases that can be recycled for use or must be directed to an appropriate disposal area). The vacuum pressure is regulated by vacuum regulator 94. The vacuum apparatus 90 applies a vacuum in and at the top of the separation tower 10 (in air space or vacuum chamber space 98) for drawing the contaminated water from the holding tank or other source (not shown) through the water inlet 20 and upwardly into, and through, the separation tower and for removing undesired gaseous materials from the contaminated water. Preferably, the vacuum force is approximately 29"-29.5" of mercury. Where a vacuum is employed, in a preferred embodiment, the operation of the inlet valve 22, outlet valve 32, liquid level indicator 102, solids discharge valve 80 and vacuum (via regulator 94) are coordinated and in communication to permit smooth operation of the separator 10 and to permit the desired fluid level 100 in the separator 10. As a back-up or safety kill switch, a second water level indicator switch device 104 is located above the first water level indicator 102 and can be programmed to shut down the system in the event that the water level 100 reaches the level of the second indicator 104. Such safety system serves, e.g., to protect the vacuum system from receiving liquid into its pump, as doing so could damage the vacuum equipment. The actual vacuum pump 90 need not be located physically on the separator as shown, but instead can be located at some other location so long as the vacuum pump 90 remains in vacuum fluid communication with separator 10 via vacuum conduit 91.

As seen in FIGS. 1-5, separation tower 10 generally has a circular cross-sectional configuration; however, it will be readily apparent to one of ordinary skill in the art, that separation tower 10 could have any desired cross-sectional configuration, such as square, oval, rectangular, etc., although a circular cross-sectional configuration is preferred. Likewise, the various fluid passageways, or conduits, described herein, disposed in fluid communication with, and between separation tower 10 also preferably have a circular cross-sectional configuration, but it will be readily apparent to one of ordinary skill in the art that such fluid passageways, or conduits, could have any desired cross-sectional configuration, such as oval, square, triangular, etc. Unless hereinafter indicated, all of the components of water treatment apparatus 10 may be made of any suitable material having the requisite strength characteristics to function as separation tower 10, as well as in the case of separation tower 10, to withstand the vacuum pressure forces that may be exerted upon separation tower 10. Accordingly, the various components of apparatus 10, unless a specific material is hereinafter set forth, may be made of commercially available metallic materials, such as various types of steel, or various plastic materials, which are well known and commercially available. Since the contaminated water is only being treated to remove sufficient amounts of undesired solids, liquid, and/or gaseous materials to render the contaminated water in compliance with various governmental discharge standards, it is not necessary that any of the components of apparatus 10 be constructed of stainless steel, unless the extra durability and corrosion resistant characteristics of stainless steel are desired.

To enhance the solids-liquids separation (and separation of entrained gasses) occurring in solid liquid separators such as separator 10, one or more sources of vibration 110 can be applied to the walls of the separator 10 and/or to one or more of the baffle plates 40 in any desired location. It is preferred to provide each baffle/deflector plate with a source of vibration. Referring to FIGS. 1 and 4, in one preferred embodiment, a vibrator motor or other source of vibration 110 is mounted onto the underside of separator 10 using a suitable mount 112.

Referring to FIGS. 2 and 2A, in another preferred embodiment, a vibrator motor or other source of vibration 110 is mounted onto the side of separator 10 using a suitable mount 112. In this preferred embodiment, if the separator is cylindrical in shape (as shown here), then preferably the vibrator mount 112 is designed to evenly disperse the vibration across the outer circumferential area of the separator 10 in the region of the baffle plates 40.

Referring to FIG. 3, in another preferred embodiment, a vibrator motor or other source of vibration 110 is mounted onto the underside of separator 10 using a suitable mount 112 (much like as in FIG. 1). In this embodiment, a vibrator connecting rod 114 is mounted within the separator, preferably along the centerline/longitudinal axis 13. The rod 114 has a top end 116 and a bottom end 118. In this embodiment, the bottom end 118 of rod 114 is fixably mounted to the first baffle plate proximate the vibrator motor 110. The rod 114 passes generally upward through each adjacent baffle plate, and terminates above the last baffle plate 40. The rod 114 serves to transmit vibration from the vibration source 110 into each baffle/deflection plate 40. Preferably, the rod 114 is fixably mounted to each baffle plate, such as by welding or other suitable means.

Figures 5, 5A:
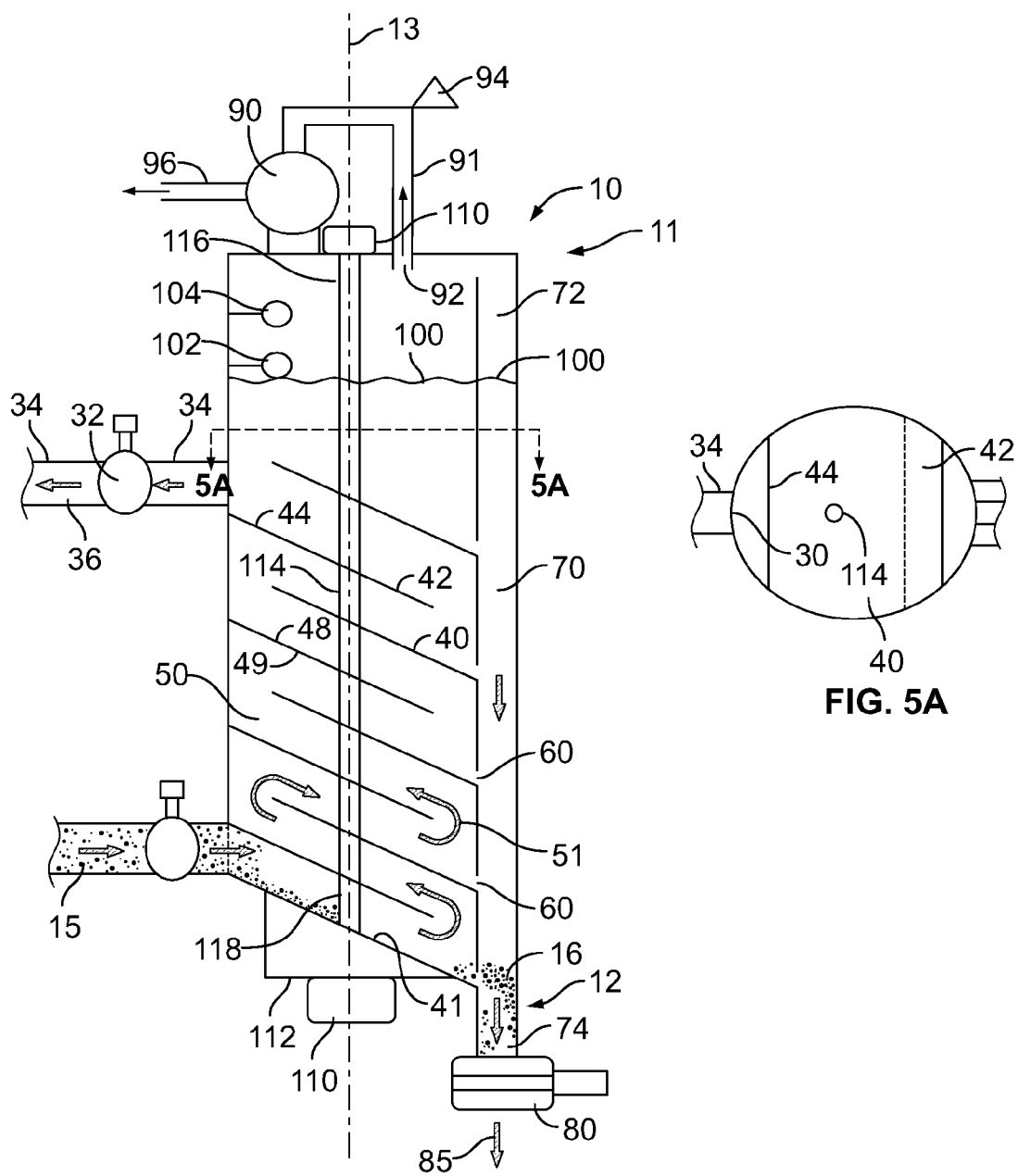
FIG. 5 is a partial cross-sectional view of one embodiment in accordance with the present invention of an apparatus for treatment of contaminated water.
FIG. 5A is a partial cross-sectional view taken along line 5A-5A of FIG. 5.

Referring now to FIGS. 5 and 5A, in an alternate preferred embodiment, the rod 114 depicted in FIG. 3 can extend from the lower end 12 of separator/vessel 10 to the upper end 11 of separator/vessel 10. In this embodiment, the vibration source 110 could be mounted on either the underside or top side of separator 10 proximate to the rod lower end 118 or rod top end 116.

As will be understood, one or more vibration sources 110 can be positioned at any desired location on or within the separator 10. The use of the vibration source improves solid liquid separation and helps maintain a clean surface on the baffle plates 40. The vibration can be created by any available source, such as, mechanical, electrical, air-driven, or hydraulic-driven vibrator devices and/or by sonic waves, microwaves, or other source of vibration. The vibration is designed to disturb the molecular bonding of the liquids and the vibration amplification can be controlled by means of a V.F.D. (variable frequency drive) or other apparatus to change the rotational speed of the motor (and hence the vibration intensity). If a air or hydraulic vibrator device is used, the amplification can be controlled through pressure regulation or valve arrangements. If electric or electronic vibration such as sonic or microwaves are used, the amplification can be adjusted by electronic means. As the flow of solids laden liquid 15 enters the inlet header 20, it is directed downward across the first vibrating plate 40, 41). The vibration applied to the bottom plate disturbs the molecular bond of the liquids and causes settling of solid particulate matter. The downward flow path along with the vibration pushes the particulates to the lower edge 42 of the slant plate 40 where it is then directed into the standoff conduit 70. The flow characteristics in the standoff conduit are such that the lack of flow does not keep the solid particulates entrained, but rather permits them to fall out to the bottom of the standoff conduit where they can be discharged for further handling, disposal or use as may be desired. The flow of the solid-liquid mixture to be treated is directed upwardly through the tortuous path 50 caused by the baffle 40 arrangement. As the solids laden liquid moves upwards through this tortuous path, separation of the solids is enhanced by the vibrational energy emitted from each plate 40, and the solids 16 are separated and fall into the standoff conduit 70 thereby repeating the process until all undesirable particulate is removed. Entrained gasses will also be released by the vibration and removed via the vacuum source.

In another preferred embodiment of the present invention, there is described an improved method of clarifying water using vibrational energy to enhance solid-liquid separation from a source of solids-laden water to be treated and/or to enhance removal of undesired gasses entrained in the waste. In this method, solids laden liquid, such as waste water, drilling mud, etc., are introduced into a flow path conduit. In a preferred embodiment, the flow path is serpentine-like. In one preferred embodiment, the flow path of the liquid to be treated within this conduit is oriented in a generally upward or vertical direction—in other words, the clarified water exits the separator at a point vertically above the separator inlet. In one embodiment, a vacuum source is applied to assist in drawing the solids-laden liquids into and through the separator and to assist in the vacuum clarification of the solid-liquid mixture to be treated. As the solid-liquid mixture moves through the system (either via vacuum or other motive force), a source of vibration is applied to the flow path. The solids falling out of solution are collected at a lower end of the separator for disposal or other desired handling, and the clarified liquid is collected outside of the outlet for further handling or disposal.

In another preferred method of the present invention, a liquid to be treated is introduced into the inlet of a separator of the types as described herein in connection with FIGS. 1-5. A vacuum is applied to the system. The liquid to be treated is then directed through a conduit configured into a tortuous flow path. Vibrational energy is applied to the flow path. As solids fall out of solution, they are collected. The clarified liquid is also collected. The solids separation system of the present invention can employ more than one separator, working either in parallel or in series, either alone or in conjunction with other treatment equipment.

As mentioned above, as the solids 16 drop through solids discharge port 60, they will fall toward the standoff conduit lower end 74 where they can be discharged from the separator 10 via, e.g., a solids discharge valve 80. Additionally, in another embodiment of the present invention, the solids discharge valve 80 is removed and the standoff lower end 74 is connected to a pump (not shown). The pump serves to pull solids out of the separator conduit lower end 74 and provide a flow force for the solids to follow. The discharge from the pump is preferably directed to a vortex removal device (not shown), such as a de-sander cone or de-silter cone (or the like) available and known to those of ordinary skill in the art. The solids collected in the de-sander or de-silter can then be directed to a desired place of disposal via standard disposal techniques.

Figures 6, 6A:
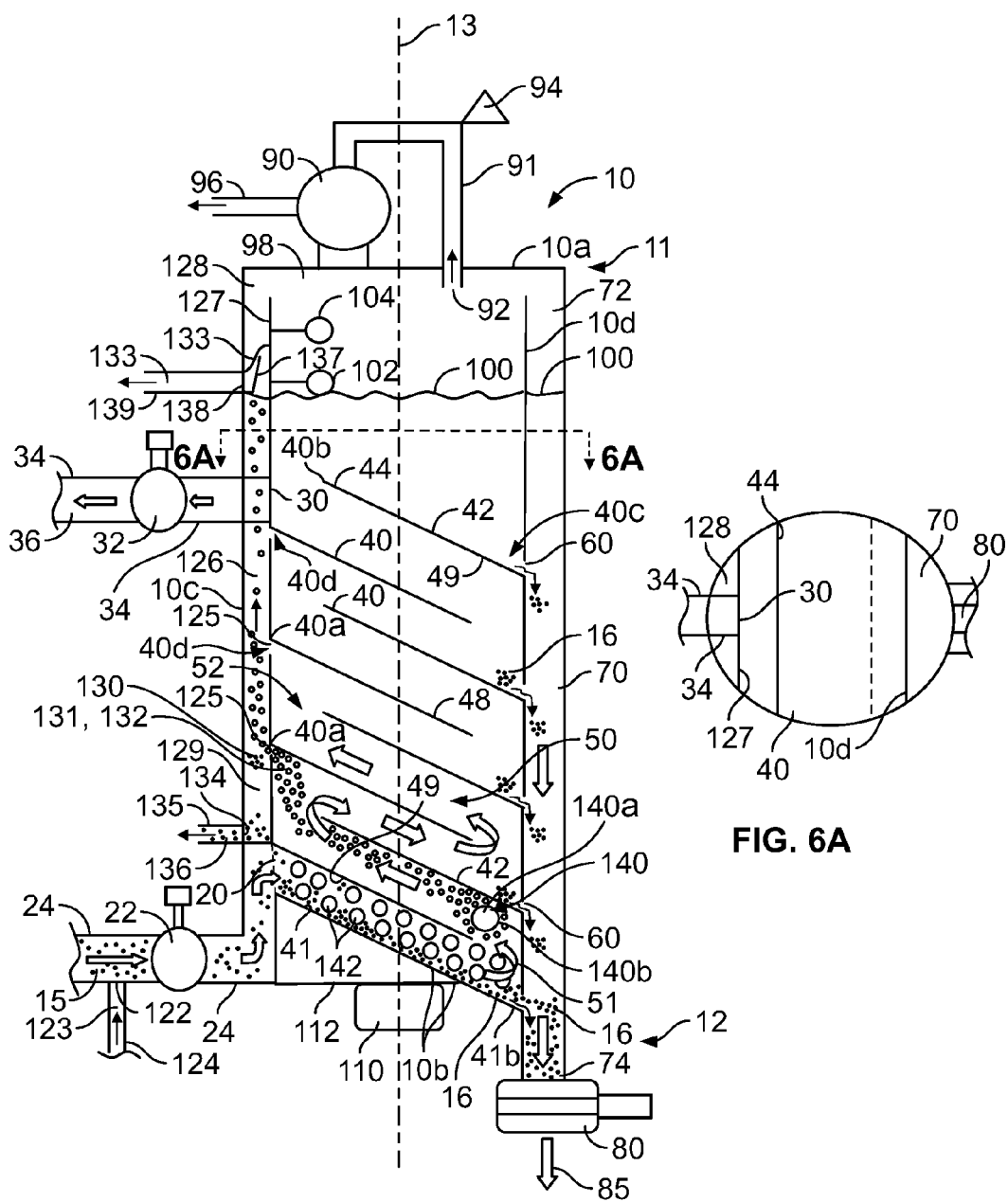
FIG. 6 is a partial cross-sectional view of one embodiment in accordance with the present invention of an apparatus for treatment of contaminated water.
FIG. 6A is a partial cross-sectional view taken along line 6A-6A of FIG. 6 depicting a separation tower embodiment having a cylindrical shape.

Referring now to FIG. 6, there is shown another embodiment illustrating additional features that may be employed to benefit. For example, the separator devices 10 described herein and in connection with FIGS. 1-6 may also be outfitted with a chemical injection inlet 122 for use in injecting desired chemicals or treatment solution streams 123 into the contaminated feed liquid 15. The chemicals or treatment solutions 123 are prepared and fed from a chemical storage receptacle (not shown) through chemical injection conduit 124 to a desired entry location in the separator (hear, shown for example proximate the inlet valve 22, but other locations could be suitable. The chemicals or treatment solutions 123 could comprise coagulants, flocculants, and other desired chemical treatment regimes based upon the characteristics of the solid/liquid feed mixture 15.

Also, referring still to FIGS. 6 and 6A, the separator devices 10 described herein and in connection with FIGS. 1-6 may also be outfitted with one or more slots or upper discharge ports 125 that fluidly connects to a secondary standoff conduit 126. Similar to FIGS. 1-3, the interior of the tower 10 can be vertically partitioned with the secondary partition bulwark 127. One of the two parallel rows of baffle plates 40 can be mounted to partition bulwark 10*d*, while the other of the two parallel rows of baffle plates 40 can be mounted on the secondary partition bulwark 127 opposite the partition bulwark 10*d*. The secondary partition bulwark extends across the bottom 10*a* of the tower 10 interior upward toward the top of the tower 10*b*, above the topmost of the plurality of baffle plates 40, but preferably not all the way to the top of the tower 10*b*. On the underside of the baffle plate attachment edge 40*a* of each baffle plate mounted to the secondary partition bulwark 127 (other than the first plate 41), there is found one or more slots or upper discharge ports 125 located in the upward slope upper corner area 40*d*. It will be understood that each baffle plate 40 is secured in sealed relationship on its two side edges to the inside surface of the tower wall 10*c*. Although FIGS. 1, 1A, and 2-6 depict an embodiment of the separation tower that is cylindrical in shape, other tower shapes are possible, such as, for example, a generally rectangular shape as illustrated with FIG. 1B (with outer walls 10*c*-1, 10*c*-2, 10*c*-3 and 10*c*-4). As such, the standoff conduit 70 serves as a primary static zone while the secondary standoff conduit 126 serves as a secondary static zone.

As the waste mixture flows downwardly along the downward slope from the plate upper end 44 to the plate lower end 42, solids 16 will fall out and preferentially be directed into the solids discharge port 60 rather than making an upward turn required to continue along the tortuous or serpentine path 50. The liquid, on the other hand, will preferentially continue along the path of least resistance up through the serpentine path 50 towards the outlet 30. Any lighter components of the waste mixture, such as gasses and oils or light colloidal or light particulate or suspended solids material, will tend to migrate up to and through the slots 125 and into the secondary standoff conduit 126. Each slot 125 is in fluid communication with the secondary standoff conduit 126 and is preferentially of a smaller opening size than that of, e.g., the outlet 30 so that the path of least resistance for the liquid will be toward the outlet 30, and not through the solids discharge port 60. In one embodiment, the slots 125 have a slit or opening width of about ¼ inch, and extend across the full width of the secondary standoff bulwark 127. It will be understood to those of ordinary skill in the art that the size and shape of the slots or upper discharge ports 125 can be varied, for example, a rectangular slit design or a circular opening design are potentially useful port configurations. Secondary standoff conduit 126 has an upper end 128 and a lower end 129. As the light gasses and oils 131 (or microbubbles 132 discussed below) pass through the slots 125, they migrate upward in the secondary standoff conduit 126. When the gasses break through the surface of the oil phase 133, they are permitted to enter the evacuated airspace 98 (the upper conduit end 128 being in fluid communication with the airspace 98) and be drawn out through the vacuum conduit 91. As the oil phase 133 reaches the top section 128 of the secondary standoff conduit 126, the oil phase 133 can spill over a weir 137 which is in fluid connection with secondary standoff conduit upper outlet 138 where the oil phase 133 (or other phase present here) can be discharged through secondary standoff conduit upper discharge tubing 139 for any desired further handling, disposal or reuse.

As the colloidal or suspended solids 130 drop through upper discharge port 125, they will fall toward the secondary standoff conduit lower end 129 where they can be discharged from the separator 10 via, e.g., a secondary standoff conduit lower outlet 134 into appropriate transfer piping/conduit 135 so that the discharged contents 136 can be directed for any desired further handling, disposal or reuse. Additionally, colloidal or suspended solids materials may become entrained in the gasses 131 or microbubbles 132 and be carried up to the oil phase surface where the gas or microbubbles will then release such material, and such material can then coagulate and fall downward to discharge outlet 134.

Additionally, still referring to FIGS. 6 and 6A, the separator devices 10 described herein and in connection with FIGS. 1-6 may also be outfitted with one or more sparging devices 140 comprising an internal conduit space 140*a* connected in fluid communication with a source of sparging gas (not shown), and one or more perforations to permit the sparge gas to discharge from the internal conduit space 140*a* into the surrounding solids/liquid mixture encountered in the separation path 50. In this embodiment, the sparging gas would not be introduced in the first section of the path 50 along lower plate 41 because the gas would migrate upward and become trapped near the contaminated liquids inlet 20. Instead, the sparging device(s) are preferentially located above the solids discharge ports 60 so that the sparge bubbles can migrate upward until they reach the upper discharge slots 125. Although only one sparge unit 140 is depicted in FIG. 6 (in the upper portion of the first upward turn of serpentine path 50), it will be understood by those having the benefit of the disclosure herein that more than one sparge unit can be employed, such as in the vicinity below each upwardly directed plate 40. In one embodiment, the sparge device comprises a porous tubular member or pipe extending across the width of the path 50. In another embodiment, a plurality of individual sparge devices are mounted proximate each other. In one embodiment, the sparge gas exits the sparge device as microbubbles. The microbubbles or microfine bubbles can assist in washing the solids. In one embodiment, the sparge gas is carbon dioxide. In another embodiment, the sparge gas is selected based on its ability to assist in removing or scrubbing oil from the solids phase of the solid liquid feed mixture 15. In one embodiment, carbon dioxide is used as the sparge gas to help wash the oil off of the solids phase. In another embodiment, sparging devices are located at every upward turn in the serpentine path 50. The sparge gas or air can vary in chemical makeup and temperature. Sparge gas temperature may be adjusted to influence the viscosity and settling rate of the fluids being treated. The actual bubble size achieved within the flow path 50 may depend on a number of factors, including, the changing conditions of the solution 15 being treated, the temperature, viscosity, solids loading, etc.

The introduction of micro-bubbles will temporally reduce the viscosity of the fluid 15 thereby allowing more particles 16 to migrate downwardly to the primary static zone for removal and disposal. The very small particles not removed will attach themselves to a gas bubble and become buoyant thereby allowing the removal upwardly to the secondary static zone (similar to Dissolved Air floatation (DAF) technology) rather than continuing along the path 50 to the exit 30. A preferred sparge gas for oil separation is carbon dioxide gas as it has a natural affinity for oil and greatly aids in the separation and reclaiming of oils. The oils will collect in the secondary static zone where it will build up and flow over the overflow weir 137 into a tank (not shown) for removal and reuse or disposal. The colloids or other small suspended solids will move into the secondary static zone where they will lose the attached gas bubble to the vacuum and settle over time to the bottom of the secondary zone to be removed through port 134 located at the lower extremity of the secondary static zone. The separator device of the present disclosure can permit 3-phase separation of liquids that are contaminated by solids and oils.

In yet another embodiment of the present disclosure, an array of spaced-apart, electrodes 142 can be introduced into the flow path 50 to serve as a source for introducing an electrical current into the fluids 15 to permit electrocoagulation to take place. In one embodiment, the electrodes are rods that extend across the flow path 50 from side to side in a matrix that itself creates a tortuous path that creates impingement of the solids causing the solids to strike the electrodes and slow down. The electrodes are electrically insulated at the point of attachment to the walls of the separator (e.g., with suitable insulating grommet or the like that can also serve to create a seal around such point of attachment), and are also spaced apart so that the electrodes do not touch each other. In another embodiment, the electrodes protrude into the flow path 50 in a staggered length fashion. Sufficient spacing exists between the electrodes 142 and the plates 40, 41 so as to permit solids to pass therebetween. A current is induced into the electrodes, and the polarity of the electrodes is alternated between positive (+) and negative (−) polarity. Process control equipment (not shown) automatically controls the polarity of the electrodes (and the amperage/voltage). An appropriate current is induced (for example, a low amperage current such as about 15 amps of current but other suitable currents can be employed.) into the electrodes.

The array of rods 142 to be used as positive and negative electrodes will be inserted between the first and second plates 41, 49 to allow maximum contact of the fluid 15 being directed through the system. The electrodes 142 can comprise any material that will conduct current flow, such as iron, aluminum, stainless steel, carbon fiber, etc. A preferred material for the electrodes 142 is carbon rods. Carbon rods have proven to be more resistant to decay from the electrical activity and more resistant to scale buildup. The addition of electro-coagulation will carry many benefits including but not limited to removal of certain dissolved solids such as heavy metals and destruction of undesired bacterial contamination.

Figure 7:
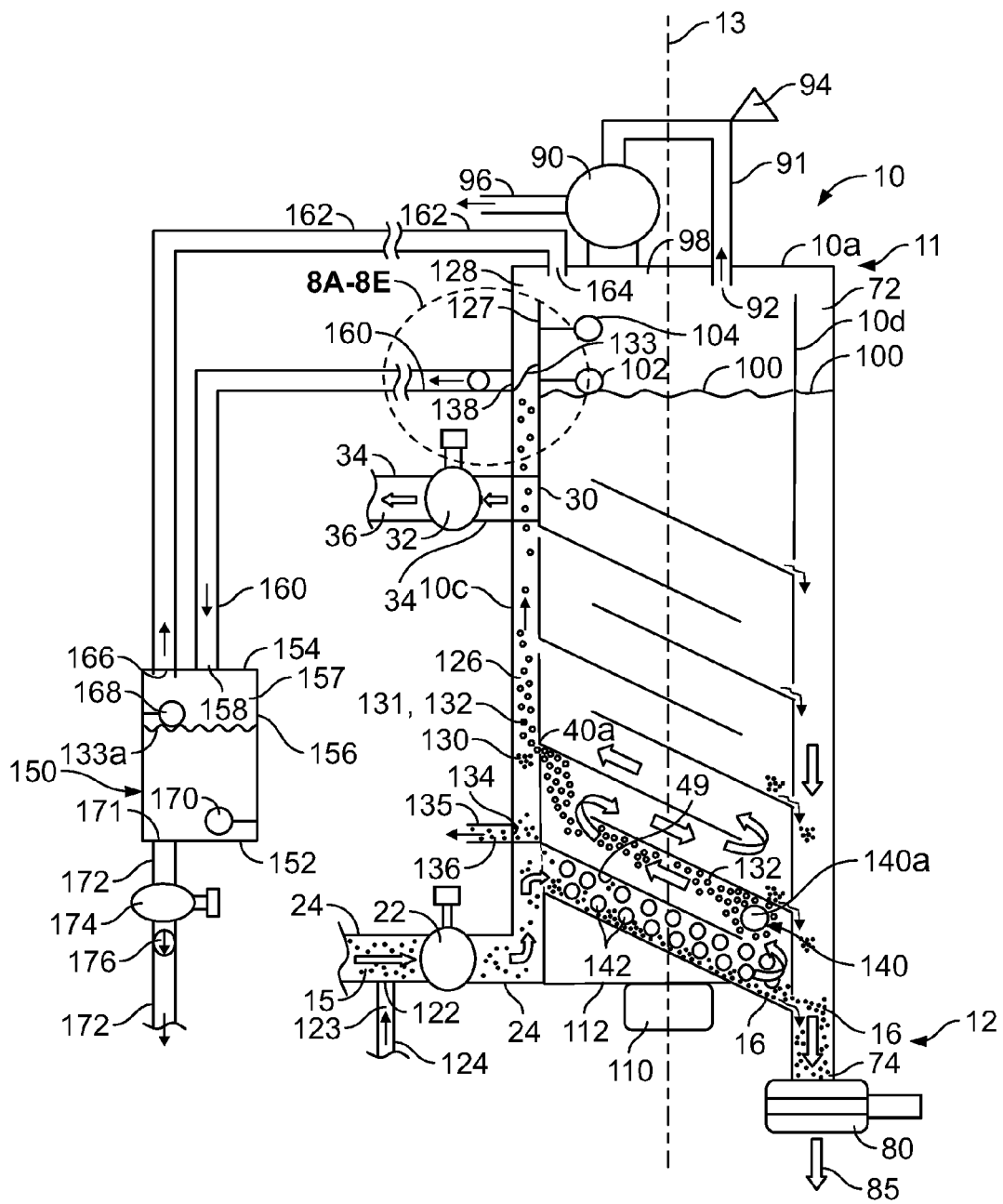
FIG. 7 is a partial cross-sectional view of one embodiment in accordance with the present invention of an apparatus for treatment of contaminated water.

Referring now to FIG. 7, the separator devices 10 described herein and in connection with FIGS. 1-6 may also be outfitted with a vacuum assisted accumulator 150 for collecting oil 133, 133*a* from the separator 10. For convenience, the same numbering is used in connection with FIG. 6 in connection with the separator device 10. In these embodiments, the accumulator 150 is in fluid, vacuum connection with the evacuated airspace 98 of the separator 10. The accumulator has a sealed accumulator housing 156 defined by outer sidewalls, an accumulator bottom 152 and accumulator top 154 all defining an internal accumulator chamber 157 where oil 133*a* may be collected within the evacuated airspace of the internal chamber 157. The accumulator has an oil inlet 158 in fluid communication with accumulator evacuated interior chamber 157 and an accumulator oil inlet conduit 160 in fluid communication with the accumulator oil inlet 158 and the secondary standoff conduit upper outlet 138 to permit oil that has risen in the secondary standoff conduit 126.

The accumulator 150 is vacuum assisted by, e.g., utilizing vacuum equalizer conduit 162 having accumulator vacuum equalizer conduit inlet 164 in fluid communication with evacuated airspace 98 and accumulator vacuum equalizer conduit outlet 166 in fluid communication with evacuated accumulator air space internal chamber 157. The accumulator 150 interior chamber 157 is preferably equipped with an upper liquid level control device/sensor (e.g., float switch, electronic sensor, sonic sensor, and the like) 168 for detecting the oil surface level 133*a* of oil collected in the accumulator 150. A lower liquid level control device/sensor (float switch, electronic sensor, sonic sensor, and the like) 170 for detecting when oil surface 133*a* collected in accumulator 150 has drained to a lower level. The collected oil may be discharged from the accumulator 150 via oil outlet 171 and through oil outlet conduit 172 for directing accumulated oil to desired storage or end use location (not shown). An oil outlet control valve 174 with a one way check valve 176 on the exit side of oil outlet control valve 174 regulates the flow of oil out of the accumulator 150. In operation, when the oil spills over the weir 137 (FIG. 6) or through the other weir designs described herein (e.g., FIGS. 8A-8E), and drains down into the vacuum assisted accumulator tank 150, the oil will begin to fill the tank and when it reaches the upper sensor 168, it will activate the discharge pump 174 to draw the oil level 133*a* down to the lower sensor 170 which will in turn signal the pump 174 to stop. The pump 174 can be a centrifugal, rotary vane, gear pump, etc. A positive check valve 176 is installed on the discharge port of the pump 174 to prevent vacuum loss during pump start up and shut down. The oil is pumped through conduit 172 to a storage tank or other desired final destination.

Figure 7A:
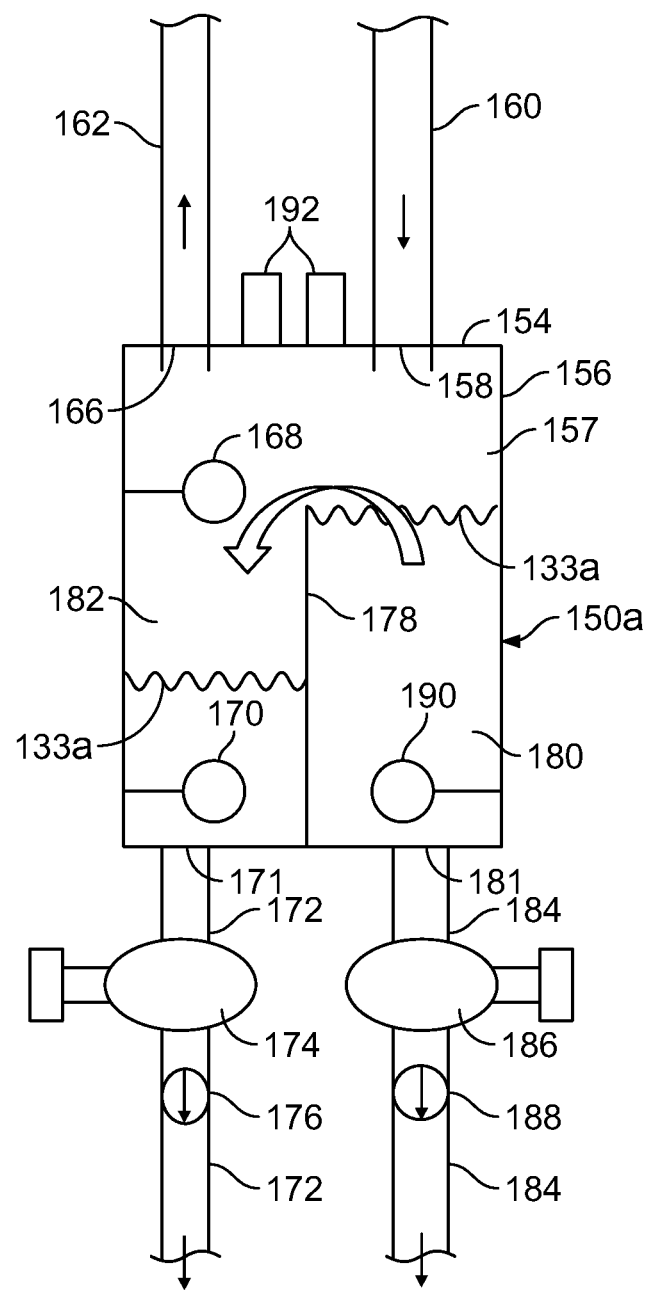
FIG. 7A is a partial cross-sectional view of an accumulator according to one embodiment of the present invention.

Referring now to FIG. 7A there is depicted an alternate embodiment of the accumulator 150*a*. Accumulator 150*a* is similar to accumulator 150 (FIG. 7) except that it employs a central partition/weir 178 extending from the floor/bottom 152 of accumulator 150*a* to a desired height within the accumulator interior space. The partition 178 creates a lower right chamber 180 and lower left chamber 182 in the accumulator 150*a*. As the oil 133 from accumulator oil inlet conduit 160 enters the accumulator 150*a*, it fills the lower right chamber 180. The cleaner oil will rise to the top and spill over the top of the partition/weir 178 into the accumulator lower left chamber 182. Any contaminants in the oil in the right side chamber 180 will sink to the bottom and can be removed through the right chamber discharge outlet 181 through discharge conduit 184 and through a control valve 186 and one-way check valve 188 and directed to a desired location via conduit 184. The cleaner oil 133 collected in the left side lower chamber 182 may be discharged via oil outlet control valve 174 with a one way check valve 176 on the exit side of oil outlet control valve 174 to thereby regulate the flow of oil out of the accumulator 150*a*. The oil 133 may be directed to a desired location via the conduit 172. Suitable liquid level sensors 168, 170 and 190 may be employed to interface with the flow control valves 174, 186. The accumulator 150*a* may also be outfitted with one or more auxiliary ports 192 for pumping down the system or bleeding atmosphere into the system during shutdown or maintenance. The extra ports allow more versatility for the accumulator.

Referring also to FIG. 7 and FIGS. 8A-8E, the separator devices 10 described herein and in connection with FIGS. 1-6 may also be outfitted with a variety of adjustable weir configurations 200, 208, 212 used in connection with the discharge of oil 133 from the secondary standoff conduit 126 (see location call-out 8A-8E of FIG. 7). For example, although FIG. 6 depicts an internal fixed weir 137 (which could also be configured to be a height adjustable weir), alternate weir configurations, that are preferably located external to the secondary standoff conduit 126 to facilitate access, can be employed to provide height adjustment of the weir to enhance the separation of oil from water and solids Like with weir 137, adjustable weirs 200, 208 and 212 are coupled with the secondary standoff conduit upper outlet 138. The function of the weirs are the same for each embodiment—to assist in better separating the oil from the water and solids mixture.

Figure 8A:
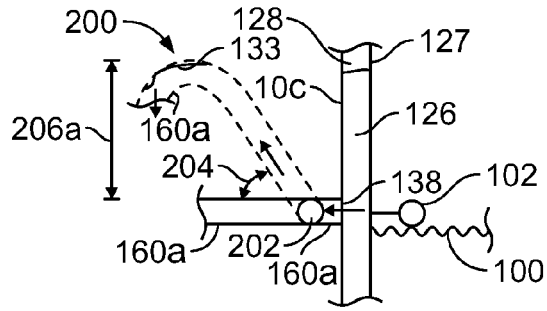
FIG. 8A is a cross-sectional view of one embodiment of a height adjustable weir, taken from view 8A-8E of FIG. 7, according to the present invention.

One example height adjustable weir is depicted in FIG. 8A. In this embodiment, there is employed a rotatably adjustable weir 200 comprising a swivel joint 202 installed inline in the accumulator oil inlet conduit 160a. The swivel joint 202 may be adjusted to a desired angle 204. The swivel joint 202 may be manually adjusted or automatically adjustable via process control of a swivel motor (not shown). As the angle 204 is increased between 0 degrees (static position) and up to 90 degrees (adjusted position), the effective weir height 206a is increased by causing the conduit 160a (preferably a flexible conduit) to move upwards thereby increasing the effective height 206a of the weir 200. The oil 133 flows through the weir 200 (via conduit 160a) to a desired location, e.g., the accumulator 150 as depicted in FIG. 7.

Figure 8B:
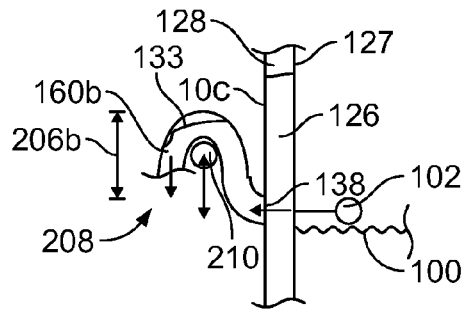
FIG. 8B is a cross-sectional view of another embodiment of a height adjustable weir, taken from view 8A-8E of FIG. 7, according to the present invention.

FIG. 8B discloses a tubing height adjustable weir 208 embodiment. In this embodiment, the oil 133 discharges from the secondary standoff conduit 126 into flexible conduit 160b. The effective weir height 206b is created by raising and lowering the flexible conduit, such as, for example, by raising or lowering a conduit guide 210 that cradles the conduit 160b, or otherwise serves as a guide to hang conduit from or drape the conduit over. As the conduit guide 210 moves upward, the effective weir height 206b increases. The conduit guide 210 can be fashioned from any type of interface that will permit sliding interface with the conduit 160b. For example, the conduit guide 210 could comprise a moveable bar, a moveable roller, a moveable sleeve, a guide wheel, or the like that can interface with the conduit 160b and urge the conduit upwards or downwards, preferably without creating any kinking in the conduit. The upward and downward movement of the conduit guide 210 may be manually adjusted or automatically adjustable via process control of a motorized mechanism (not shown).

Alternately, the conduit 160b could simply be manually raised or lowered to a desired effective height 206b and secured in place with one or more suitable fasteners (preferably where the fasteners are capable of quick fastening and unfastening). Additionally, one or more fixed position conduit guides could be arranged to permit a fixed selection of height adjustment by placing (or otherwise attaching) the conduit 160b over (or to) the desired conduit guide to achieve the desired effective height 206b.

Figure 8C:
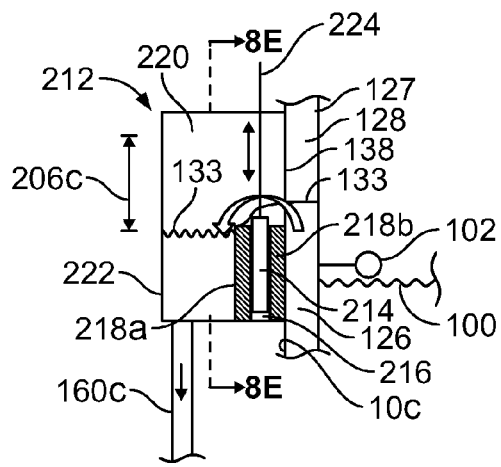
FIG. 8C is a cross-sectional side view of yet another embodiment of a height adjustable weir, taken from view 8A-8E of FIG. 7 according to the present invention, showing the weir gate in a lower position.
Figure 8D:
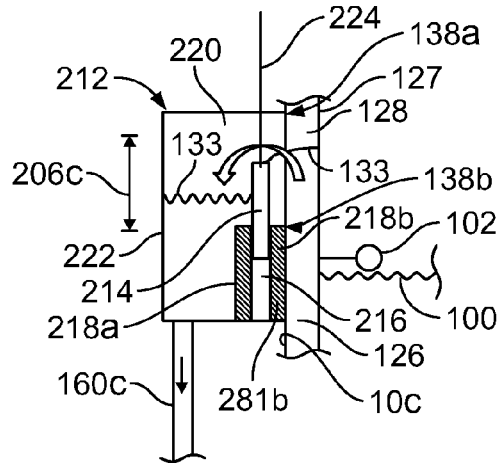
FIG. 8D is a cross-sectional side view of the height adjustable weir of FIG. 8C, showing the weir gate in a raised position.
Figure 8E:
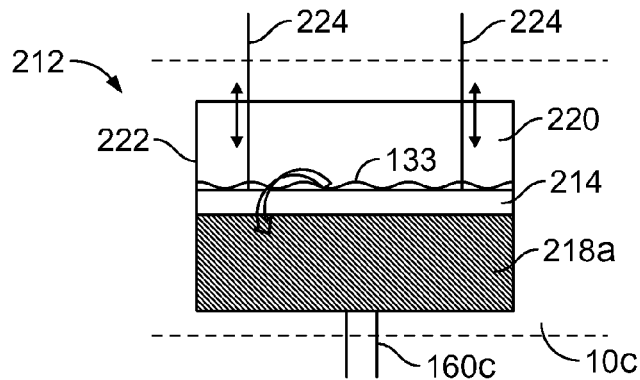
FIG. 8E is a cross-sectional front view of the height adjustable weir of FIG. 8C, taken along lines 8E-8E.

Referring now to FIGS. 8C-8E there is shown a gate height adjustable weir 212. In this embodiment, the basic structure comprises a moveable gate 214 that is capable of moving upward or downward in a slot 216 defined by opposed slot walls 218a, 218b (or other suitable structure or tracks. The gate 214 is sized and mounted proximate the discharge opening 138 of the secondary standoff conduit 126. In this embodiment, the discharge opening is shown having an upper boundary 138a and a lower boundary 138b. The effective weir height 206c is thereby adjusted by moving the gate 214 up or down within the slot 216. FIGS. 8C and 8E shown the gate in a lower position; FIG. 8D shows the gate in a raised position. Suitable stops (not shown) could be employed, if necessary, to stop the upward travel of the gate 214 at a desired location. The height of the gate 214 would be sized to permit the desired effective weir height 206c to be obtained. In this embodiment, the weir 212 is attached in sealed relationship with the separator 10 to permit the ambient evacuated internal airspace 98 of the separator 10 to be in fluid communication with the internal airspace 220 of the weir 212. The weir 212 further comprises an outer housing 222 maintained in sealed relation to the separator 10. As oil 133 flows up the secondary standoff conduit 126, it then proceeds through the secondary standoff conduit upper outlet 138 and over the top of the height adjusted gate 214 and into the internal section 220 of the housing 222. Discharge conduit 160c is attached to the bottom of the housing 222 to permit the exit of oil 133 through the conduit 160c to a desired location, e.g., the accumulator 150 as depicted in FIG. 7. In this embodiment, the gate height may be adjusted manually or by motorized, process control mechanisms known in the art. For example, as depicted, stanchions or posts 224 (that pass through housing 222 in sealed fashion) could be manually raised or lowered to place the gate 214 in position for the desired weir height 206c, or could be connected to a motor to automatically raise or lower the gate. It will be apparent to those of ordinary skill in the art having the benefit of this disclosure that countless mechanisms can be employed to achieve gate movement, either manually or automatically. For example, mechanical geared mechanisms could be employed to move the gate up or down. Hydraulics could also be employed, such as, for example, by integrating a hydraulic lift system (not shown) in the slot 216 with a hydraulically actuated piston being mounted in the slot to the inner housing and underside edge of the gate 214 to permit the piston to move the gate 214 up and down within the slot 216. A sealed hatch (not shown) could be installed on the housing 222 to permit ready access to the interior of the gate adjustable weir 212 to permit, e.g., manual adjustment of the weir height or maintenance/cleaning.

Although embodiments have been shown illustrating height adjustable weirs, those of ordinary skill in the art having the benefit of this disclosure could create other alternative embodiments that are within the scope of this invention.

References

The following represents an exemplary list of references.

U.S. Patent References

1. U.S. Pat. No. 5,741,426 McCabe et al.

All references referred to herein are incorporated herein by reference. While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

I claim:

1. A vacuum assisted solid-liquid separation apparatus for treating contaminated liquids contaminated with undesired solids and gasses, comprising:
   (a) an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;
   (b) a tower interior space defined as the space within the outer wall, top wall and bottom wall;
   (c) a contaminated liquids inlet located proximate the vessel lower end for introducing the contaminated liquids into the tower interior space;
   (d) a clarified liquids outlet located above the contaminated liquids inlet for discharging the clarified liquids to a desired location;
   (e) a plurality of baffle plates disposed in the tower interior space in a spaced apart relationship, with at least some of the baffle plates being angularly disposed with respect to the longitudinal axis of the separation tower to define a generally serpentine fluid flow passageway,
      the serpentine fluid passageway having a first end in fluid communication with the contaminated liquid inlet, and a second end in fluid communication with the clarified water outlet and the tower interior space proximate the upper end of the tower,
      the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner;
   (f) one or more solids discharge ports located in one or more of the downward slope corners;
   (g) a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space;
   (h) one or more upper discharge slots located in one or more of the upward slope upper corners;
   (i) a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space;
   (j) a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet;
   (k) a vacuum equalization conduit inlet in fluid communication with the tower interior space and located above the clarified liquid outlet,
   (l) one or more sources of vibrational energy applied to the separation apparatus; and
   (m) an oil accumulator for collecting oil, said accumulator comprising
      an enclosed housing having a top, a bottom, sidewalls and an inner chamber,
      an accumulator oil inlet proximate or in said accumulator top,
      said discharge tubing being connected between said accumulator oil inlet and said secondary standoff upper outlet, said discharge tubing placing said accumulator inner chamber in fluid communication with said secondary standoff conduit,
      an accumulator vacuum inlet proximate said accumulator top,
      an accumulator vacuum equalizer conduit connected between said accumulator vacuum inlet and said vacuum equalization conduit inlet, said equalizer conduit placing said accumulator inner chamber in fluid communication with said tower interior space,
      an oil outlet located in or proximate said accumulator bottom,
      an oil outlet conduit connected to said oil outlet,
      an oil outlet control valve connected to said oil outlet conduit for discharging oil from said accumulator through discharge conduit to a desired location, said control valve employing a one-way check valve on the discharge side of said control valve,
      an upper liquid level control device within said accumulator inner chamber to sense the liquid level and communicate with said oil outlet control device, and
      a lower liquid level control device within said accumulator inner chamber to sense the liquid level and communication with said oil outlet control device.

2. The vacuum assisted solid-liquid separation apparatus of claim 1 further comprising: (l) one or more gas spargers mounted within said serpentine fluid passageway in an area above said one or more solids discharge ports located in said one or more of the downward slope corners for introducing a sparge gas into said serpentine fluid pathway.

3. The vacuum assisted solid-liquid separation apparatus of claim 2 wherein said sparge gas is selected from the group consisting of air, inert gases, carbon dioxide, nitrogen, helium, and combinations thereof.

4. The vacuum assisted solid-liquid separation apparatus of claim 2 wherein the sparge gas is carbon dioxide.

5. The vacuum assisted solid-liquid separation apparatus of claim 1 further comprising: (l) one or more electrocoagulation electrodes housed within said serpentine fluid passageway capable of discharging an electrical current into the fluid, wherein said electrodes are capable of alternating between a positive polarity and a negative polarity and are controlled by process control equipment.

6. The vacuum assisted solid-liquid separation apparatus of claim 1 further comprising a chemical injection port for introducing into said serpentine fluid path one or more desired treatment chemicals.

7. The vacuum assisted solid-liquid separation apparatus of claim 6 wherein said treatment chemical is a coagulant.

8. The vacuum assisted solid-liquid separation apparatus of claim 1 further comprising:

(l) one or more electrocoagulation electrodes housed within said serpentine fluid passageway capable of discharging an electrical current into the fluid, wherein said electrodes are capable of alternating between a positive polarity and a negative polarity and are controlled by process control equipment;

(m) one or more gas spargers mounted within said serpentine fluid passageway in an area above said one or more solids discharge ports located in said one or more of the downward slope corners for introducing a sparge gas into said serpentine fluid pathway; and (n) a chemical injection port for introducing into said serpentine fluid path one or more desired treatment chemicals.

9. The vacuum assisted solid-liquid separation apparatus of claim 1 wherein said weir is a height adjustable weir.

10. The vacuum assisted solid-liquid separation apparatus of claim 9 wherein said height adjustable weir is a rotatably adjustable weir comprising a swivel joint mounted in-line of said discharge tubing proximate said secondary standoff conduit upper outlet, said swivel joint capable of directing said discharge tubing upward at an angle ranging between about 0 degrees and 90 degrees to create an increase in the effective weir height as the tubing moves upward, and to create a decrease in the effective weir height as the tubing moves downward, wherein said discharge tubing is flexible, wherein said swivel joint is selected from the group consisting of manually operated swivel joints and automatic motor driven swivel joints.

11. The vacuum assisted solid-liquid separation apparatus of claim 9 wherein said height adjustable weir is a tubing height adjustable weir comprising a moveable conduit guide movably mounted proximate said secondary standoff conduit upper outlet, said conduit guide capable of securing said discharge tubing at desired heights relative to said upper outlet to provide a desired effective weir height, wherein said discharge tubing is flexible.

12. The vacuum assisted solid-liquid separation apparatus of claim 9 wherein said height adjustable weir is a gate height adjustable weir comprising:
a weir housing having an internal weir airspace, an upper end, and a lower end, said weir housing being mounted in sealed fashion on the exterior of said separator over said secondary standoff conduit upper outlet, said upper outlet having an upper boundary and a lower boundary,
a moveable gate mounted in a slot, the gate capable of being moved upwardly and downwardly in said slot, said slot positioning said gate proximate and below said upper outlet, said upward movement of said gate creating an increase in an effective weir height, said downward movement of said gate creating a decrease in said effective weir height, and
discharge conduit attached to said weir housing lower end, said discharge conduit being in fluid communication with said internal weir space.

13. The vacuum assisted solid-liquid separation apparatus of claim 12 wherein said gate height adjustable weir is manually adjustable.

14. The vacuum assisted solid-liquid separation apparatus of claim 12 wherein said gate height adjustable weir is automatically adjustable via motorized operation.

15. The vacuum assisted solid-liquid separation apparatus of claim 1 wherein said accumulator further comprises:
a centrally-located vertical partition extending across said accumulator internal chamber and upwardly in said chamber from said accumulator bottom to a desired height within said chamber, said partition creating a lower right chamber and a lower left chamber, said accumulator oil inlet being located proximate said right chamber to permit entry of oil from said weir to be directed into said right chamber, said oil collecting in said right chamber and capable of spilling over said partition into said left chamber,
a left chamber oil outlet located in or proximate said accumulator bottom in said left chamber, said left chamber oil outlet being connected to said oil outlet conduit,
a right chamber outlet located in or proximate said accumulator bottom in said right chamber,
an outlet control valve connected to said right chamber outlet conduit for discharging contents from said accumulator right chamber through discharge conduit to a desired location, said control valve employing a one-way check valve on the discharge side of said control valve,
said lower liquid level control device being located within said accumulator left chamber to sense the liquid level and for communication with said oil outlet control device, and
a second lower liquid level control device located within said accumulator right chamber to sense the liquid level and for communication with said right chamber outlet control valve.

16. The vacuum assisted solid-liquid separation apparatus of claim 15 wherein said accumulator further comprises one or more auxiliary ports mounted on said accumulator top.

17. A method of separating contaminated liquids containing solids, water-based liquids, oils and gasses from a mixed phase contaminated slurry comprising the steps of:
(a) directing the contaminated liquids into the inlet of a vacuum assisted solid-liquid separation apparatus for treating contaminated liquids contaminated with undesired solids and gasses, the apparatus comprising:
i. an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;
ii. a tower interior space defined as the space within the outer wall, top wall and bottom wall;
iii. a contaminated liquids inlet located proximate the vessel lower end for introducing the contaminated liquids into the tower interior space;
iv. a clarified liquids outlet located above the contaminated liquids inlet for discharging the clarified liquids to a desired location;
v. a plurality of baffle plates disposed in the tower interior space in a spaced apart relationship, with at least some of the baffle plates being angularly disposed with respect to the longitudinal axis of the separation tower to define a generally serpentine fluid flow passageway,
vi. the serpentine fluid passageway having a first end in fluid communication with the contaminated liquid inlet, and a second end in fluid communication with the clarified water outlet and the tower interior space proximate the upper end of the tower,
vii. the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner;

viii. one or more solids discharge ports located in one or more of the downward slope corners;

ix. a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space;

x. one or more upper discharge slots located in one or more of the upward slope upper corners;

xi. a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space;

xii. a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet;

xiii. a vacuum equalization conduit inlet in fluid communication with the tower interior space and located above the clarified liquid outlet, xiv. one or more sources of vibrational energy applied to the separation apparatus, xv. an oil accumulator for collecting oil, said accumulator comprising an enclosed housing having a top, a bottom, sidewalls and an inner chamber, an accumulator oil inlet proximate or in said accumulator top, said discharge tubing being connected between said accumulator oil inlet and said secondary standoff upper outlet, said discharge tubing placing said accumulator inner chamber in fluid communication with said secondary standoff conduit, an accumulator vacuum inlet proximate said accumulator top, an accumulator vacuum equalizer conduit connected between said accumulator vacuum inlet and said vacuum equalization conduit inlet, said equalizer conduit placing said accumulator inner chamber in fluid communication with said tower interior space, an oil outlet located in or proximate said accumulator bottom, an oil outlet conduit connected to said oil outlet, an oil outlet control valve connected to said oil outlet conduit for discharging oil from said accumulator through discharge conduit to a desire location, said control valve employing a one-way check valve on the discharge side of said control valve, an upper liquid level control device within said accumulator inner chamber to sense the liquid level and communicate with said oil outlet control device, and a lower liquid level control device within said accumulator inner chamber to sense the liquid level and communication with said oil outlet control device;

(b) applying at least one vibrational energy source to the separation apparatus;

(c) applying a vacuum source at the vacuum inlet via the vacuum apparatus;

(d) flowing the solids laden liquids from the inlet upwardly through the generally serpentine fluid flow passageway with the vacuum apparatus to cause undesired solid materials striking the baffle plates to be directed downwardly into the standoff conduit toward the lower end of the separation tower, and gasses, oils and light colloidal or suspended solids to be directed upwardly into the secondary standoff conduit toward the upper end of the separation tower;

(e) removing clarified liquid from the separation tower through the clarified water outlet, (f) removing undesired gasses out through the vacuum apparatus;

(g) removing undesired solids from the standoff conduit;

(h) removing undesired solids from the secondary standoff conduits;

(i) removing oils from the secondary standoff conduit through the accumulator; and (j) removing oils from the accumulator.

18. The method of claim 17 wherein the solid-liquid separation apparatus further comprises: one or more electrocoagulation electrodes housed within said serpentine fluid passageway capable of discharging an electrical current into the fluid, wherein said electrodes are capable of alternating between a positive polarity and a negative polarity and are controlled by process control equipment, and said method further comprises the step of introducing a current from said electrodes into said serpentine fluid passageway, and alternating the polarity of said electrodes between positive and negative polarity.

19. The method of claim 17 wherein the solid-liquid separation apparatus further comprises: one or more gas spargers mounted within said serpentine fluid passageway in an area above said one or more solids discharge ports located in said one or more of the downward slope corners for introducing a sparge gas into said serpentine fluid pathway, and said method further comprises the step of introducing said sparge gas into said serpentine fluid pathway.

20. The method of claim 17 wherein the solid-liquid separation apparatus further comprises: a chemical injection port for introducing into said serpentine fluid path one or more desired treatment chemicals, and said method further comprises the step of introducing said one or more chemicals into said serpentine fluid pathway.

21. The method of claim 17 wherein:

the solid-liquid separation apparatus further comprises:

one or more electrocoagulation electrodes housed within said serpentine fluid passageway capable of discharging an electrical current into the fluid, wherein said electrodes are capable of alternating between a positive polarity and a negative polarity and are controlled by process control equipment, one or more gas spargers mounted within said serpentine fluid passageway in an area above said one or more solids discharge ports located in said one or more of the downward slope corners for introducing a sparge gas into said serpentine fluid pathway, and a chemical injection port for introducing into said serpentine fluid path one or more desired treatment chemicals, and wherein said method further comprises the steps of:
- introducing a current from said electrodes into said serpentine fluid passageway, and alternating the polarity of said electrodes between positive and negative polarity,
- introducing said sparge gas into said serpentine fluid pathway, and
- introducing said one or more chemicals into said serpentine fluid pathway.

22. The method of claim 17 wherein said weir of the solid-liquid separation apparatus further comprises a height adjustable weir, and said method further comprises the step of adjusting the height of said weir.

* * * * *